United States Patent Office 3,641,110
Patented Feb. 8, 1972

---

3,641,110
PHENOXY-ALIPHATIC ACIDS
William Laszlo Bencze, New Providence, N.J., assignor to Ciba Corporation, Summit, N.J.
No Drawing. Continuation-in-part of application Ser. No. 728,871, May 14, 1968, which is a continuation-in-part of application Ser. No. 558,251, June 17, 1966, which in turn is a continuation-in-part of application Ser. No. 323,868, Nov. 15, 1963. This application Jan. 29, 1969, Ser. No. 795,029
Int. Cl. C07c 65/114, 69/76, 103/22
U.S. Cl. 260—473 G
33 Claims

ABSTRACT OF THE DISCLOSURE

Phenoxy-aliphatic acids, e.g. those of the formula

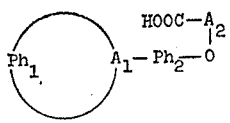

$Ph_1$=a 1,2-phenylene
$Ph_2$=a 1,2-, 1,3- or 1,4-phenylene
$A_1$=alkylene forming 5–7 membered ring
$A_2$=aliphatic hydrocarbon radical and functional derivates thereof are hypocholesterolemic agents.

CROSS-REFERENCE TO RELATED APPLICATIONS

This is a continuation-in-part of application Ser. No. 728,871, filed May 14, 1968, which in turn is a continuation-in-part of application Ser. No. 558,251, filed June 17, 1966, which in turn is a continuation-in-part of application Ser. No. 323,868, filed Nov. 15, 1963, now abandoned.

SUMMARY OF THE INVENTION

The present invention concerns and has for its object the provision of new phenoxy-aliphatic acids having the Formula I

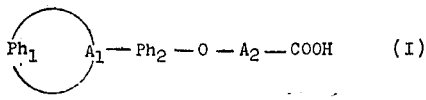

in which $Ph_1$ is a 1,2-phenylene radical, $Ph_2$ is a 1,2-, 1,3- or 1,4-phenylene radical, $A_1$ is lower alkylene forming with $Ph_1$ a 5 to 7 membered ring carrying $Ph_2$ at one ring-carbon atom thereof and $A_2$ is a lower aliphatic hydrocarbon radical, of their functional derivatives, as well as of corresponding pharmaceutical compositions and of methods for the preparation and application of these products. Said compositions are useful hypocholesterolemic agents in the treatment or management of arteriosclerosis.

DESCRIPTION OF THE PREFERRED EMBODIMENTS

The phenylene radicals $Ph_1$ and $Ph_2$ are unsubstituted or substituted by one or more than one of the same or of different substituents attached to any of the four positions available for substitution. Such substituents are, for example, lower alkyl, e.g. methyl, ethyl, n- or i-propyl or -butyl, 3- to 8 ring-membered cycloalkyl, e.g. cyclopropyl, cyclopentyl, cyclohexyl or cycloheptyl, etherified or esterified hydroxy, such as lower alkoxy, e.g. methoxy, ethoxy, n- or i-propoxy or -butoxy, or halogeno, e.g. fluoro, chloro or bromo, or trifluoromethyl. The term "lower," referred to above and hereinafter in connection with organic radicals or compounds respectively, defines such with up to 8, preferably up to 5, carbon atoms. Above all, $Ph_1$ represents 1,2-phenylene, (lower alkyl)-1,2-phenylene, (5 to 7 ring-membered cycloalkyl)-1,2-phenylene, (lower alkoxy)-1,2-phenylene, (halogeno)-1,2-phenylene or (trifluoromethyl)-1,2-phenylene and $Ph_2$ represents 1,2-, 1,3- or preferably 1,4-phenylene, (lower alkyl)-1,2-, 1,3- or 1,4-phenylene, (lower alkoxy)-1,2-, 1,3- or 1,4-phenylene, (halogeno)-1,2-, 1,3- or 1,4-phenylene or (trifluoromethyl)-1,2-, 1,3- or 1,4-phenylene.

The lower alkylene portion $A_1$ substituting two adjacent positions of $Ph_1$ may be unbranched or branched and has preferably 3 to 8, particularly 3 to 5, carbon atoms. Above all the ring-carbon atom adjacent to $Ph_1$ carries $Ph_2$. Said alkylene portion represents, for example, 1,3-propylene, 1,3-, 2,4- or 1,4-butylene, 2- or 3-methyl-1,4-butylene, 2,3-dimethyl-1,4-butylene, 1,4-, 2,5- or 1,5-pentylene, 3-methyl-1,4-pentylene, 2-methyl-1,5-pentylene, 1,4-, 2,5- or 1,5-hexylene, 2,6- or 3,5-heptylene.

The lower aliphatic radical $A_2$ represents, for example, lower alkylene, alkenylene or alkynylene, preferably such having up to 5 carbon atoms, such as methylene, 1,1- or 1,2-ethylene, 1,1-, 1,2-, 2,2- or 1,3-propylene, 1,1-, 1,2-, 2,3- or 1,4-butylene, 1,1-, 2,2-, 3,3- or 2,4-pentylene; etheneylene, 1,2-, 2,3- or 1,3-propenylene, 1,4-butenylene, 1,4- or 2,3-but-2-enylene or 2,3-pent-2-enylene; ethynylene, 1,3-propynylene, 1,3-butynylene, 1,4-but-2-ynylene or 1,4-pent-2-ynylene. Said radical may also stand for 1,1-cycloalkylidene having from 3 to 8, preferably from 5 to 7, ring-carbon atoms, e.g. 1,1-cyclopentylidene, 1,1-cyclohexylidene or 1,1-cycloheptylidene, as well as 1,1-cyclopropylidene, 1,1-cyclo-butylidene or 1,1-cyclooctylidene.

Functional derivatives of the acids of Formula I are preferably their esters, for example, their lower alkyl, e.g. methyl, ethyl, n- or i-propyl, n-, i-, sec. or tert. butyl esters, or substituted lower alkyl, particularly tert. amino-lower alkyl, lower alkoxy-lower alkyl or aralkyl, e.g. benzyl or 3-pyridylmethyl, esters, in which the tertiary amino group is above all di-lower alkylamino, e.g. dimethylamino or diethylamino, lower alkyleneimino, e.g. pyrrolidino or piperidino, or mono-aza- or oxa-lower alkyleneimino, such as piperazino or 4-lower alkyl-piperazino, e.g. 4-methyl- or ethyl-piperazino, or morpholino. Other functional derivatives are unsubstituted or substituted amides, e.g. mono- or di-lower alkylamides, mono- or bicyclic lower alkyleneamides, e.g. the N,N-dimethyl- or diethylamide, N,N-butylene or pentyleneamide or 3-aza-bicyclo[3,2,2]nonyleneamide, or amides of aminoacids, e.g. glycine, glycyclglycine, taurine, methionine, or aspartic acid, as well as the nitriles, hydroxamic acids and salts. In said ester or amide moieties, two heteroatoms are separated from each other by at least 2 carbon atoms, preferably by 2 or 3 carbon atoms, and the tertiary amino group can also be linked with the lower alkyl chain to form a monoaza-cycloalkyl or -cycloalkyl-lower alkyl moiety, e.g. 2- or 3-pyrrolidyl, 1-(methyl or ethyl)-3-pyrrolidyl, 3- or 4-piperidyl or -piperidyl-methyl, 1-(methyl or ethyl)-3- or 4-piperidyl or -piperidyl-methyl.

Salts of the above described compounds are either ammonium or metal salts of the acids, or acid addition salts of the compounds with basic character, especially pharmaceutically acceptable, non-toxic salts, such as the ammonium salts derived from ammonia or amines, or more particularly metal salts, such as alkali or alkaline earth metal, e.g. sodium, potassium, magnesium or calcium salts. Compounds with basic character are, for example, the aminoalkyl esters. Such compounds form acid addition salts, such as those of inorganic or organic acids, e.g. hydrochloric, hydrobromic, sulfuric, phosphoric, formic, acetic, propionic, pivalic, glycolic, lactic, malonic, succinic, maleic, hydroxymaleic, malic, tartaric, citric, benzoic, salicylic, 4-aminosalicylic, 2-phenoxybenzoic, 2-acetoxybenzoic, nicotinic, isonicotinic, methane sulfonic, ethane sulfonic, ethane 1,2-disulfonic, 2-hydroxyethane sulfonic, p-toluene sulfonic or naphthalene 2-sulfonic acid. Salts, either those of metals or acids, may also be used as intermediates, for example, in the preparation of pharmaceutically acceptable salts, in the purification of the free compounds or for identification or characterization purposes. Acid addition salts, which are prepared primarily for identification purposes are, for example, those of acidic organic nitro compounds, e.g. picric, picrolonic or flavianic acid, or complex acids, e.g. phosphotungstic, phosphomolybdic, chloroplatinic or Reinecke acid.

The compounds of this invention possess valuable pharmacological propertise. For example, they cause a reduction of the cholesterol level in the blood, as can be demonstrated in animal tests using, for example, mammals, e.g. rats, dogs or monkeys, as test objects. The compounds of the invention are advantageously administered orally, e.g. to male rats in the form of aqueous or polyethyleneglycol solutions or suspensions by stomach tube, or to male beagle dogs by gelatine capsules for example in the dosage range between about 0.1 and 100 mg./kg./day, preferably between about 0.1 and 50 mg./kg./day, especially between about 1 and 25 mg./kg./day. The animals (rats) may either be on a standard or high cholesterol diet and serum total cholesterol is determined in orbital blood before and after treatment with the compounds of the invention. In addition, serum free and esterified glycerol, liver constituents, e.g. free and esterified cholesterol, glyceride-glycerol, lipid-phosphorus, glycogen and protein, can be determined. At high dose levels, e.g. at about 100 mg./kg./day, the compounds of the invention cause an enlargement of the liver in male rats, due to an increase in size and number of liver cells. This hepatomegalic effect is reversible upon withdrawal of said compounds. The compounds of the invention also exhibit some antiinflammatory effects, as can be demonstrated especially in the rat turpentine pleuritis test, and also in the kaolin or carrageenin rat paw edema test, performed, for example, according to Winter et al., Proc. Soc. Exp. Biol. & Med. 111, 544 (1962). According to it, the compounds of the invention are applied, in the form of aqueous solutions or suspensions, by stomach tube to male and female mature rats, in the dosage range between about 1 and 100 mg./kg./day, preferably between about 10 and 75 mg./kg./day, advantageously between about 40 and 60 mg./kg./day. About 1 hour later 0.06 ml. of a 1% aqueous suspension of carrageenin is injected into the rat's left hind paw and 3 hours subsequently any anti-inflammatory activity can be expressed by the difference of the volume and/or weight of the edematous left paw and that of the right paw, as compared with said difference estimated from untreated control animals.

The compounds of the invention are, therefore, useful as hypolipidemic (hypochloesterolemic) agents bringing about an amelioration of certain syndromes, such as those caused by arteriosclerosis, e.g. atherosclerosis, as liver-protecting or curing agents, for example, in the treatment of liver injury, poisoning or disease, e.g. in cases of poisoning by chemicals, such as carbon tetrachloride, or cirrhosis, and/or as anti-inflammatory agents in the treatment or management of arthritic and dermatopathologic conditions. Furthermore, they can be used as intermediates in the preparation of other valuable products, particularly of pharmacologically active compounds.

Particularly useful are the compounds of Formula I, in which $Ph_1$ represents 1,2-phenylene, (lower alkyl)-1,2-phenylene, (5 to 7 ring-membered cycloalkyl)-1,2-phenylene, (lower alkoxy)-1,2-phenylene, (halogeno)-1,2-phenylene or (trifluoromethyl)-1,2-phenylene, $Ph_2$ is 1,2-, 1,3- or 1,4-phenylene, (lower alkyl)-1,2- 1,3- or 1,4-phenylene, (lower alkoxy)1,2-, 1,3- or 1,4-phenylene, (halogeno)-1,2-, 1,3- or 1,4-phylene or (trifluoromethyl)-1,2-, 1,3- or 1,4-phenylene, $A_1$ is lower alkylene forming with $Ph_1$ a 5 to 7 membered ring carrying $Ph_2$ at one ring-carbon atom thereof and $A_2$ is lower alkylene, the lower alkyl, lower alkoxy-lower alkyl, $HPh_2$-lower alkyl, pyridyl-lower alkyl, Am-lower alkyl, monoazacycloalkyl or monoazacycloalkyl-lower alkyl esters thereof, wherein alkoxy, Am or the aza-nitrogen is separated from the carboxy oxygen by at least 2 carbon atoms and Am is di-lower alkylamino, lower alkyleneimino or mono-aza or oxa-lower alkyleneimino, the amide, mono -or di-lower alkylamides, mono- or bicyclic lower alkyleneamides, the hydroxamic acid, nitrile, ammonium, alkali metal or alkaline earth metal salts thereof and pharmaceutically acceptable acid addition salts of the basic esters.

Preferred are compounds of Formula II

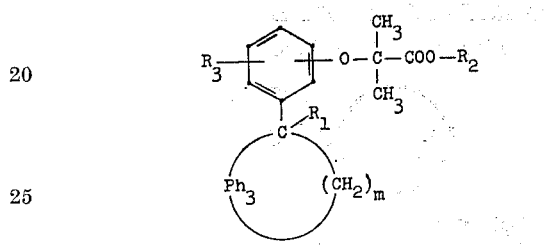

in which $Ph_3$ is 1,2-phenylene, (lower alkyl)-1,2-phenylene, (5 to 7 ring-membered cycloalkyl)-1,2-phenylene, (lower alkoxy)-1,2-phenylene, (halogeno)-1,2-phenylene or (trifluoromethyl)-1,2-phenylene, $m$ is an integer from 2 to 4, $R_1$ is hydrogen or lower alkyl, $R_2$ is hydrogen, lower alkyl, lower alkoxy-lower alkyl, phenyl-lower alkyl, pyridyl-lower alkyl, di-lower alkylamino-lower alkyl, lower alkyleneimino-lower alkyl, N-lower alkyl-piperidyl or N-lower alkyl-piperidyl-lower alkyl, in which the nitrogen atoms are separated from the carboxy oxygen atom by at least two carbon atoms, and $R_3$ is hydrogen, lower alkyl or halogen, ammonium, alkali-metal or alkaline earth metal salts of the compounds in which $R_2$ is hydrogen and pharmaceutically acceptable acid addition salts of the compounds in which $R_2$ contains a nitrogen atom.

Especially valuable compounds are those of Formula III

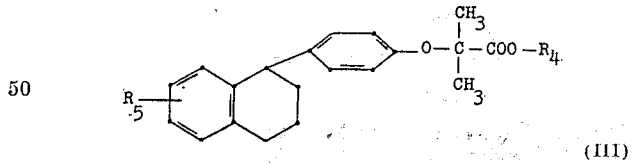

in which $R_4$ is hydrogen, an alkali metal, lower alkyl, pyridyl-lower alkyl, di-lower alkylamino-lower alkyl or N-lower alkyl-piperidyl, and $R_5$ preferaby is hydrogen, but also lower alkyl, cyclohexyl, lower alkoxy, halogen or trifluoromethyl, which, when given at oral doses between about 1.0 and 50 mg./kg./day, preferably between about 1.0 and 25 mg./kg./day, to rats, which are either on a normal or high cholesterol diet, show outstanding hypocholesterolemic activity.

The compounds of this invention are prepared according to methods known per se. For example, they are obtained by:

(a) converting in a compound of Formula IV

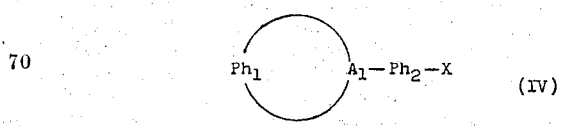

in which X is a substituent capable of being converted into group —O—$A_2$—Y, wherein Y is a free or functionally converted carboxyl group, the substituent X into said group —O—A$_2$—Y, or (b) hydrogenating in a compound of Formula V

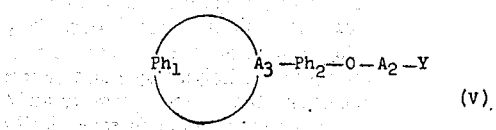

in which A$_3$ is lower alkenylene forming with Ph$_1$ a 5 to 7 membered ring carrying Ph$_2$ at one ring-carbon atom thereof, the double bond in said A$_3$ portion and, if desired, converting any resulting compound into another of the invention.

In the starting material of Formula IV, the substituent X may be converted into the group —O—A$_2$—Y in one step or in stages. A particular suitable substituent X is the hydroxy group. Its conversion into the desired final group is carried out according to known methods. For example, the starting material having such phenolic hydroxy group may be converted into a salt, particularly a metal salt, such as an alkali metal, e.g. lithium, sodium or potassium salt. Its formation may be achieved, for example, by reacting the starting material with an alkali metal hydroxide, carbonate, hydride, amide, alkoxide or hydrocarbon compound, e.g. sodium or potassium hydroxide, potassium carbonate, lithium or sodium hydride, sodium or potassium amide, lithium, sodium or potassium ethoxide, ethoxide or tert. butoxide, butyl or phenyl lithium or phenyl sodium. Such starting material, particularly the salt thereof, is then reacted with a compound of the formula Z—A$_2$—Y, in which Z stands for a reactive esterified hydroxyl group. The latter is above all such esterified with a strong mineral acid, particularly a hydrohalic acid, e.g. hydrochloric or hydrobromic acid, with sulfuric or a strong organic sulfonic acid, such as a lower alkane or benzene sulfonic acid, e.g. methane, ethane or p-toluene sulfonic acid. In the compounds Z—A$_2$—Y, Y preferably stands for a free or esterified carboxyl group, but may also represent cyano, and Z for halogeno, having preferably an atomic weight greater than 19 and representing above all chloro or bromo. The formation of the metal salt may also be carried out in situ, i.e. the corresponding phenol and the reactive ester reacted together in the presence of a metal salt-forming reagent, e.g. potassium carbonate.

The conversion of a free hydroxy group substituting Ph$_2$ may also be carried out by reacting the corresponding starting material with a compound of the formula HO—A$_2$—Y in the presence of a disubstituted carbonate, for example, a diaryl carbonate, e.g. diphenyl carbonate, or especially a di-lower alkyl carbonate, e.g. dimethyl or diethyl carbonate. This reaction is carried out at an elevated temperature, ranging from about 100° to about 210°, preferably from about 180° to about 200°, if desired, in the presence of a transesterification catalyst, e.g. sodium or potassium carbonate or a sodium lower alkanolate and preferably in the absence of a diluent.

A further modification of the conversion of a hydroxy group substituting Ph$_2$ into the group —O—Az—Y comprises reacting said starting material with a corresponding aliphatic aldehyde or ketone in the presence of a tri- or tetrahalogenated methane derivative as, for example, chloroform, 1,1,1-trichloroacetone, bromoform, 1,1,1-tribromo-acetone, iodoform, chloral, chloral hydrate, bromal, bromal hydrate, carbon tetrachloride or carbon tetrabromide, and a strong base. The latter is particularly an alkali metal hydroxide, e.g. sodium or potassium hydroxide, which is preferably used in solid form. The reaction is advantageously carried out in the presence of a diluent, which may be furnished by an excess of the aldehyde or ketone reagent.

A further substituent X capable of being converted into the group —O—A$_2$—Y is that of the formula —O—CO—R$_6$, in which R$_6$ stands for esterified or etherified hydroxy, for example, halogeno, particularly chloro or bromo, or lower alkoxy, e.g. methoxy or ethoxy, as well as phenoxy. The corresponding starting material is reacted with a compound of the formula HO—A$_2$—Y according to known methods, preferably at temperatures ranging between about 100–200°, if desired, in the presence of a suitable transesterification catalyst, e.g. sodium or potassium carbonate, and in the absence or presence of a suitable diluent.

The compounds of Formula V may be converted into those of the invention according to known methods, preferably by treatment with catalytically activated or nascent hydrogen, such as hydrogen in the presence of nickel, palladium or platinum catalysts; or generated during electrolysis. They are new and are intended to be included within the scope of the present invention. Their pharmaceutical activity is comparable to that of the compounds of Formula I.

The resulting compounds of the invention can be converted into each other according to methods known per se. For example in those containing a free carboxyl group, such group is converted into a functionally converted carboxyl group according to known procedures, for example, by treatment with an alcohol, such as a lower alkanol, in the presence of an esterifying agent, e.g. hydrochloric or sulfuric acid, or with a corresponding diazo-compound. The carboxylic acid may also be converted into its halide, e.g. chloride and the latter is reacted with an alkali metal, e.g. sodium or potassium alcoholate, such as lower alkoxide, ammonia, a primary or secondary amine, in order to yield esters or amides respectively. The carboxylic acid may further be reacted with a reactive ester of an alcohol, such as an aliphatic halide, e.g. a lower alkyl halide or tert. amino-lower alkyl halide, in the presence of a base, e.g. potassium carbonate. An ammonium salt of said acids may be dehydrated, for example, by treatment with phosphorus pentoxide or oxychloride, in order to yield the amide, which may be further dehydrated to yield the corresponding nitrile. In resulting compounds containing a functionally converted carboxyl group, this group may be converted into a free or another converted carboxyl group by known methods. For example, resulting esters may be hydrolysed, advantageously by treatment with a base, e.g. sodium or potassium hydroxide. A nitrile or amide may be converted into the free acid by hydrolysis with either a strong base or acid, e.g. sulfuric acid. Furthermore, a resulting ester may be transesterified for example, by treatment with an alcohol, e.g. a lower alkanol, in the presence of a metal alcoholate, e.g. a sodium, potassium or aluminum lower alkoxide, an alkali metal cyanide, or N-benzyl trimethylammonium hydroxide. A resulting ester may also be converted into an amide, for example, by treatment with ammonia, a primary or a secondary amine, if necessary, under increased pressure or converted into the hydroxamic acid by treatment with hydroxylamine. A resulting nitrile can also be converted into a corresponding ester, for example, by treatment with an alcohol, e.g. a lower alkanol, in the presence of a suitable mineral acid, e.g. sulfuric or hydrochloric acid.

A resulting acid may be converted into its salts according to conventional methods, for example, by reacting it with an about stoichiometric amount of a suitable salt-forming reagent, such as ammonium hydroxide, or an alkali metal hydroxide, amide or hydride. A salt of this type may be reconverted into the free acid by treatment with an acid, e.g. hydrochloric, sulfuric or acetic acid. A resulting compound having an acid addition salt-forming group, such as an amino group, may be converted into an acid addition salt thereof, for example, by reacting it with an acid, such as one of the previously-mentioned acids or with a suitable anion exchange preparation, and isolating the desired salt. The latter may be converted into the free compound by treatment with a base, e.g. a metal hydroxide, ammonia or a hydroxyl ion exchange preparation.

The starting material used is known or, if new, may be prepared according to methods known per se, e.g. Ber. 24, 179 (1891) or Bull. Soc. Chim. Fr. 1956, 128. For example that of Formula IV may be prepared from compounds of the Formulae VI and VII

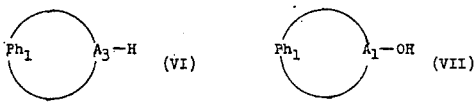

by reaction with a compound H—$Ph_2$—$X_0$, in which $X_0$ stands for hydroxy or lower alkoxy, in the presence of a Lewis acid, such as sulfuric or phosphoric acid or aluminum chloride. A resulting compound, in which $X_0$ stands for alkoxy, is then hydrolyzed, for example with the use of hydrobromic or hydriodic acid, or advantageously pyridine hydrochloride.

Compounds of the Formula V may be prepared from ketones, e.g. those corresponding to the alcohols of Formula VII or those corresponding to the compounds of Formula I wherein $A_1$ contains an oxo group, by reducing them either with a Grignard compound $$Hal—Mg—Ph_2—X$$

or a complex light metal hydride, e.g. sodium borohydride, respectively and dehydrating the resulting alcohols and converting the group X in any of the unsaturated compounds obtained, e.g. analogous to procedure (a).

Resulting mixtures of isomers, e.g. such of the compounds of the invention or of the starting material thereof may be separated into the single isomers by exploiting physicochemical differences, such as differences in solubility or different boiling points between such compounds. Racemates are resolved into the optical antipodes according to conventional resolution procedures, e.g. separation of diastereomeric salts or esters, for example, salts of d-α-(phenyl or 1-naphthyl)-ethylamine or l-cinchonidine with the d,l-acids of Formula I or the d- or l-tartrates of their basic esters, or esters of the phenolic starting material with optically active acids, e.g. d-camphor sulfonic acid. The above reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure.

The invention also comprises any modification of the above process, wherein a compound resulting as an intermediate at any stage thereof, is used as starting material and the remaining steps are carried out or the process is discontinued at any stage thereof, or in which the starting material is formed under the reaction conditions or is used in the form of its salts or reactive derivatives. Those starting materials are preferably used, which lead to those products indicated above as the preferred embodiments of the invention.

The pharmacologically active compounds of the invention can be used, for example, for the manufacture of pharmaceutical compositions containing them in conjunction or admixture with inorganic or organic, solid or liquid pharmaceutical excipients, suitable preferably for enteral but also parenteral or topical administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods and contain about 0.1 to 75%, more particularly 1 to 50% of the active ingredient. They are also intended to be included within the scope of the present invention.

The following examples are intended to illustrate the invention and are not to be construed as being limitations thereon. Temperatures are given in degrees centigrade and all parts wherever given are parts by weight.

EXAMPLE 1

A solution of 11.2 g. of 1-(4-hydroxy-phenyl)-1,2,3,4-tetrahydro-naphthalene in 250 ml. of xylene is treated with 1.15 g. of metallic sodium and is heated to reflux for ninety minutes while stirring. A total of 10.0 g. of ethyl 2-bromo-isobutyrate is added and the reaction mixture is refluxed for six hours while stirring. Heating is discontinued, and the reaction mixture is diluted with 5 ml. of ethanol and with 100 ml. of water. The organic layer is separated, and the aqueous phase is extracted twice with diethyl ether. The combined organic solutions are washed twice with water and with a saturated aqueous solution of sodium chloride, dried over sodium sulfate, filtered and evaporated under reduced pressure. The residue is distilled twice; the desired ethyl 2-[4-(1,2,3,4-tetrahydro-1-naphthyl)-phenyloxy]-isobutyrate of the formula

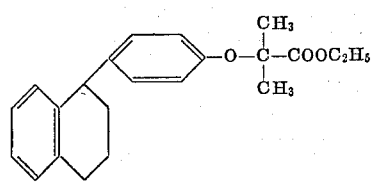

is collected at 170–175°/0.3 mm.; (198°/0.4 mm.).

The starting material used in the above procedure is prepared as follows: To a mixture of 13.0 g. of aluminium chloride and 20.0 g. of phenol in 20 ml. of hexane is added dropwise a solution of 15.0 g. of 1,2,3,4-tetrahydro-naphthalene-1-ol in hexane while stirring and cooling with tap-water. After the hydrogen chloride evolution subsides, stirring is continued at room temperature for an additional two hours, and the reaction mixture is then poured into 100 ml. of an ice-cold 6 N aqueous hydrochloric acid and 50 ml. of hexane. The mixture is stirred and the crystalline material is filtered off and air-dried; yield: 23.5 g. The desired 1 - (4 - hydroxy-phenyl)-1,2,3,4-tetrahydro-naphthalene is purified by recrystallization from a 1:1-mixture of ethanol and water, M.P. 124–126°.

EXAMPLE 2

A solution of 8.5 g. of ethyl 2-[4-(1,2,3,4-tetrahydro-1-naphthyl)-phenoxy]-isobutyrate in 30 ml. of methanol is added to a solution of 1.7 g. of potassium hydroxide in 30 ml. of methanol, and the reaction mixture is allowed to stand at room temperature for sixty hours. The solvent is then evaporated under reduced pressure. The residue is dissolved in water; the aqueous solution is washed twice with diethyl ether and is then acidified with 15 ml. of 2 N hydrochloric acid. The organic material is extracted three times with diethyl ether, and the organic extracts are washed with a saturated aqueous solution of sodium chloride, dried over sodium sulfate and evaporated to dryness. The crude residue (5.2 g.) is recrystallized twice from a mixture of diethyl ether and hexane to yield the 2 - [4 - (1,2,3,4 - tetrahydro-1-naphthyl)-phenoxy]-isobutyric acid of the formula

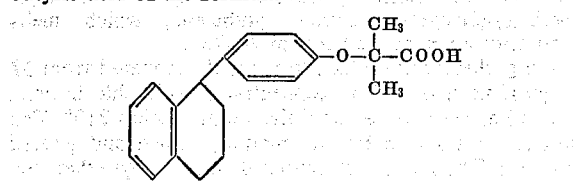

which melts at 131–132°.

EXAMPLE 3

The following compounds are prepared according to the previously described and illustrated procedure by selecting the appropriate starting materials:

ether, the extract dried, evaporated in vacuo and the residue recrystallized from benzene to yield the 2-[4-(1,2,3,4-tetrahydro-1-naphthyl)-phenoxy]-acetic acid of the formula

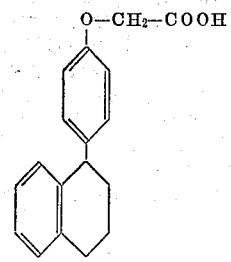

melting at 125–126°.

| Starting material | Reagents | Product |
|---|---|---|
| 1-(4-hydroxy-phenyl)-1,2,3,4-tetrahydronaphthalene | Sodium hydride plus methyl 2-bromo-isobutyrate. | Methyl 2-[4-(1,2,3,4-tetrahydro-1-naphthyl)-phenyloxy]-isobutyrate. |
| 1-(4-hydroxy-phenyl)-1-methyl-1,2,3,4-tetrahydro-naphthalene | Sodium hydride plus ethyl 2-bromo-isobutyrate. | Ethyl 2-[4-(1-methyl-1,2,3,4-tetrahydro-1-naphthyl)-phenyloxy]-isobutyrate. |
| 1-(3-chloro-4-hydroxy-phenyl)-1,2,3,4-tetrahydro-naphthalene | _____do_____ | Ethyl 2-[2-chloro-4-(1,2,3,4-tetrahydro-1-naphthyl)-phenyloxy]-isobutyrate. |
| 1-(4-hydroxy-3-methylphenyl)-1,2,3,4-tetrahydro-naphthalene | Sodium hydride plus ethyl 2-bromo-2-methyl-butyrate. | Ethyl 2-[4-(2-methyl-1,2,3,4-tetrahydro-1-naphthyl)-phenyloxy]-butyrate. |
| 1-(4-hydroxy-phenyl)-7-methyl-1,2,3,4-tetrahydro-naphthalene | Sodium hydride plus ethyl 2-bromo-isobutyrate. | Ethyl 2-[4-(7-methyl-1,2,3,4-tetrahydro-1-naphthyl)-phenyloxy]-isobutyrate. |
| 7-chloro-1-(4-hydroxy-phenyl)-1,2,3,4-tetrahydro-napthalene | _____do_____ | Ethyl 2-[4-(7-chloro-1,2,3,4-tetrahydro-1-naphthyl)-phenyloxy]-isobutyrate. |
| 1-(4-hydroxy-phenyl)-1,2,3,4-tetrahydro-naphthalene | Sodium hydride plus ethyl 1-bromo-cyclohexane carboxylate. | Ethyl 1-[4-(1,2,3,4-tetrahydro-1-naphthyl)-phenyloxy]-cyclohexane carboxylate. |
| 1-(4-hydroxy-phenyl)-indane | Sodium hydride plus ethyl 2-bromo-isobutyrate. | Ethyl 2-[4-(1-indanyl)-phenyloxy]-isobutyrate. |
| 1-(4-hydroxy-phenyl)-1-benzsuberane | _____do_____ | Ethyl 2-[4-(1-benzsuberyl)-phenyloxy]-isobutyrate. |
| 2-(4-hydroxy-phenyl)-1,2,3,4-tetrahydro-naphthalene | _____do_____ | Ethyl 2-[4-(1,2,3,4-tetrahydro-2-naphthyl)-phenyloxy]-isobutyrate. |
| 1-(3,4-dihydroxy-phenyl)-1,2,3,4-tetrahydro-naphthalene | _____do_____ | 1-[3,4-di-(2-carbethoxy-2-propyloxy)phenyl]-1,2,3,4-tetrahydro-naphthalene. |
| Ethyl 2-[4-(1-methyl-1,2,3,4-tetrahydro-1-naphthyl)-phenyloxy]-isobutyrate | Potassium hydroxide in ethanol___ | 2-[4-(1-methyl-1,2,3,4-tetrahydro-1-naphthyl) phenoloxy]-isobutyric acid. |
| Ethyl 2-[2-chloro-4-(1,2,3,4-tetrahydro-1-naphthyl)-phenyloxy]-isobutyrate | _____do_____ | 2-[2-chloro-4-(1,2,3,4-tetrahydro-1-naphthyl)-phenyloxy]-isobutyric acid. |
| Ethyl 2-[4-(2-methyl-1,2,3,4-tetrahydro-1-naphthyl)-phenyloxy]-butyrate | _____do_____ | 2-[4-(2-methyl-1,2,3,4-tetrahydro-1-naphthyl)-phenyloxy]-isobutyric acid. |
| Ethyl 2-[4-(7-methyl-1,2,3,4-tetrahydro-1-naphthyl)-phenyloxy]-isobutyrate | Potassium hydroxide in methanol__ | 2-[4-(7-methyl-1,2,3,4-tetrahydro-1-naphthyl) phenyloxy]-isobutyric acid. |
| Ethyl 2-[4-(7-chloro-1,2,3,4-tetrahydro-1-naphthyl)-phenyloxy]-isobutyrate | Potassium hydroxide in ethanol___ | 2-[4-(7-chloro-1,2,3,4-tetrahydro-1-naphthyl)-phenyloxy]-isobutyric acid. |
| Ethyl 1-[4-(1,2,3,4-tetrahydro-1-naphthyl)-phenyloxy]-cyclohexane carboxylate | Potassium hydroxide in methanol__ | 1-[4-(1,2,3,4-tetrahydro-1-naphthyl) phenyloxy]-cyclohexane carboxylic acid. |
| Ethyl 2-[4-(1-indanyl)-phenyloxy]-isobutyrate | Potassium hydroxide in ethanol___ | 2-[4-(1-indanyl)-phenyloxy]-isobutyric acid. |
| Ethyl 2-[4-(1-benzsuberyl)-phenyloxy]-isobutyrate | Potassium hydroxide in methanol__ | 2-[4-(1-benzsuberyl)-phenyloxy]-isobutyric acid. |
| Ethyl 2-[4-(1,2,3,4-tetrahydro-2-naphthyl)-phenyloxy]-isobutyrate | _____do_____ | 2-[4-(1,2,3,4-tetrahydro-2-naphthyl) phenyloxy]-isobutyric acid. |
| 1-[3,4,-di-(2-carbethoxy-2-propyloxy)-phenyl]-1,2,3,4-tetrahydro-naphthalene | _____do_____ | 1-[3,4-di-(2-carboxy-2-propyloxy)-phenyl]-1,2,3,4-tetrahydro-naphthalene. |
| 2-[4-(1,2,3,4-tetrahydro-1-naphthyl)-phenyloxy]-isobutyric acid | 2-N,N-diethylaminoethyl chloride hydrochloride plus potassium carbonate. | 2-N,N-diethylamino-ethyl 2-[4-(1,2,3,4-tetrahydro-1-naphthyl) phenyloxy]-isobutyrate. |
| 2-[4-(1-methyl-1,2,3,4-tetrahydro-1-naphthyl)phenyloxy]-isobutyric acid | 2-(1-piperidino)-ethyl chloride hydrochloride plus potassium carbonate. | 2-(1-piperidino)-ethyl 2-[4-(1-methyl 1,2,3,4-tetrahydro-1-naphthyl)phenyloxy]-isobutyrate. |
| 2-[2-chloro-4-(1,2,3,4-tetrahydro-1-naphthyl)-phenyloxy]-isobutyric acid | 2-methoxyethanol plus sulfuric acid. | 2-methoxyethyl 2-[2-chloro-4-(1,2,3,4-tetrahydro-1-naphthyl))-phenyloxy]-isobutyrate. |

EXAMPLE 4

To the solution of 22.4 g. 1-(4-hydroxy-phenyl)-1,2,3,4-tetrahydro-naphthalene in 200 ml. acetone 8.8 g. sodium hydroxide are added while stirring and heating to gentle reflux. After dissolution 10.0 g. chloroacetic acid in 100 ml. acetone are added dropwise. When the mixture turns into a thick paste, 500 ml. acetone are added to facilitate stirring and refluxing is continued for one more hour. The reaction mixture is filtered, the residue suspended in 500 ml. water and the suspension acidified with 25 ml. concentrated hydrochloric acid. It is extracted with diethyl

EXAMPLE 5

The mixture of 13.44 g. 1-(4-hydroxy-phenyl)-1,2,3,4-tetrahydro-naphthalene, 12.0 g. sodium hydroxide and 300 ml. acetone is heated to reflux while stirring. Then the solution of 7.92 g. chloroform in 60 ml. acetone is added at such a rate that reflux is maintained without external heating. The dropping funnel is then rinsed with 20 ml. acetone and the mixture is refluxed for two hours. It is then cooled to 10°, filtered and the residue washed two times with 30 ml. acetone. The residue is slurried in 150 ml. water, acidified with 12 ml. concentrated hydrochloric acid and the mixture extracted three times with 50 ml. methylene chloride. The combined extracts are washed with 50 ml. water, dried, and concentrated to 100 ml. Hereupon, 75 ml. heptane are added and the mixture is again concentrated to 100 ml. The concentrate is stirred overnight, cooled to −10° and the precipitate formed is filtered off. It is washed with 20 ml. heptane, dried in vacuo at 50°, dissolved in a refluxing mixture of 7.5 ml. ethyl acetate and 42.5 ml. heptane, the solution clarified through 1 g. filter cellulose in a warm funnel and the filtrate cooled overnight to −10°. The precipitate formed is filtered off, washed with 5 ml. 15% ethyl acetate in heptane and dried in vacuo at 50° to yield the 2-[4-(1,2,3,4-tetrahydro-1-naphthyl)-phenoxy]-isobutyric acid melting at 129–131°; it is identical with the product obtained according to Example 2.

The starting material is prepared as follows: To the mixture of 8.36 g. sodium borohydride and 250 ml. anhydrous ethanol, 50.0 g. 1-tetralone are added within five minutes. The mixture is stirred and refluxed for three hours, then cooled to about 50° and 120 ml. 15% aqueous acetic acid are added in order to reach a pH of about 6. The mixture is concentrated in vacuo to about 150 ml., the oily residue extracted with 50 and 25 ml. portions of methylene chloride, the extract washed with 50 ml. water, 50 and 25 ml. portions of 5% aqueous sodium bicarbonate, dried, filtered and evaporated. The residue is distilled and the fraction boiling at 76°/0.14 mm. Hg collected; it represents the 1,2,3,4-tetrahydro-1-naphthol.

The solution of 40.6 g. thereof in 27.6 g. phenol is added to the stirred suspension of 18.35 g. aluminum chloride in 27.6 g. phenol, 130 ml. benzene and 110 ml. heptane. The rate of addition is regulated so that the temperature does not exceed 50° and the mixture is stirred at this temperature for four hours. It is then cooled to about 25° and poured onto a mixture of 82.6 g. ice and 68.8 ml. concentrated hydrochloric acid. The slurry obtained is diluted with 100 ml. ethyl acetate, stirred for 5 minutes, and the organic layer separated. The aqueous layer is extracted with 90 ml. ethyl acetate and the combined extracts washed twice with 50 ml. water, dried, filtered, and evaporated in vacuo. The residue is taken up on 69 ml. methylene chloride, 110 ml. heptane are added and the mixture is cooled to −10° overnight. The precipitate formed is filtered off, washed with 30 ml. methylene chloride-heptane (1:2) and dried in vacuo at 50° to yield the 1-(4-hydroxy-phenyl)-1,2,3,4-tetrahydro-naphthalene melting at 122–126°.

EXAMPLE 6

0.6 g. 10% palladium charcoal in 50 ml. ethyl acetate are saturated with hydrogen at atmospheric pressure. To the suspension 1.0 g. 2-[4-(3,4-dihydro-1-naphthyl)-phenoxy]-acetic acid in 25 ml. ethyl acetate are added and the whole is hydrogenated at atmospheric pressure and at room temperature until the hydrogen up-take has stopped. The mixture is filtered, the filtrate evaporated under reduced pressure, and the residue recrystallized from benzene to yield the 2-[4-(1,2,3,4-tetrahydro-1-naphthyl)-phenoxy]-acetic acid melting at 123–124°; it is identical with the product obtained according to Example 4.

The starting material is prepared as follows: To the Grignard reagent, prepared from 3.4 g. magnesium, 26.2 g. 4-bromoanisole, 5 drops of methyl iodide and 300 ml. tetrahydrofuran, 20.0 g. 1-tetralone are added and the mixture is refluxed overnight while stirring. Hereupon 100 ml. saturated aqueous ammonium chloride are added and the mixture concentrated under reduced pressure. The aqueous concentrate is extracted with diethyl ether, the extract dried and evaporated. The residue is dissolved in 500 ml. ethanol and 100 ml. 10% hydrochloric acid are added. After refluxing the mixture for 30 minutes, it is evaporated in vacuo, the residue slurried in water and extracted with diethyl ether. The extract is dried, evaporated, the residue distilled and the fraction boiling at 155–165°/0.45 mm. Hg collected; it represents the 1-(4-methoxy-phenyl)-3,4-dihydronaphthalene, which melts after trituration with ethanol at 74–76°.

4.0 g. thereof are added to the melt, prepared from 37 g. pyridine and 17.1 g. concentrated hydrochloric acid, which has been heated until the vapor reaches 210°. The mixture is refluxed for 30 minutes, cooled and poured onto ice. The mixture is extracted with diethyl ether, the extract dried, filtered and evaporated. The residue is recrystallized from ethanol to yield the 1-(4-hydroxy-phenyl)-3,4-dihydro-naphthalene, melting at 140–142°.

The mixture of 2.1 g. thereof, 0.9 g. sodium hydroxide and 50 ml. acetone is heated to reflux while stirring. Hereupon 1.4 g. chloroacetic acid in 50 ml. acetone are added dropwise during 10 minutes and refluxing is continued for 2½ hours. The precipitate formed is filtered off, dissolved in water, the solution extracted with diethyl ether, and the aqueous layer acidified with hydrochloride acid. It is extracted with diethyl ether, the extract washed with aqueous sodium bicarbonate and the aqueous layer separated. It is acidified with hydrochloric acid, extracted with diethyl ether, the extract dried and evaporated. The residue solidifies upon standing and is recrystallized from ethyl acetate to yield the 2-[4-(3,4-dihydro-1-naphthyl)-phenoxy]-acetic acid, melting at 158–160°.

EXAMPLE 7

To the solution of 11.2 g. 1-(4-hydroxy-phenyl)-1,2,3,4-tetrahydro-naphthalene in 200 ml. m-xylene, 1.15 sodium are added and the mixture is refluxed for 3 hours while stirring. After cooling to 90° 10.0 g. ethyl α-bromo butyrate in 20 ml. m-xylene are added dropwise and refluxing and stirring is continued for 6 hours. After cooling the reaction mixture is filtered, the filtrate evaporated in vacuo, the residue dissolved in diethyl ether, the solution washed with water, dried and evaporated. The residue is distilled in a high vacuum and the main fraction triturated with petroleum ether whereupon crystallization occurs. The crystals are collected and washed with petroleum ether to yield the ethyl α-[4-(1,2,3,4-tetrahydro-1-naphthyl)-phenoxy]-butyrate of the formula

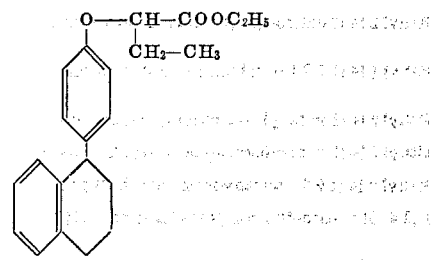

melting at 76–78°.

EXAMPLE 8

To the solution of 13.76 g. ethyl α-[4-(1,2,3,4-tetrahydro-1-naphthyl)-phenoxy]-butyrate in 7 ml. methanol, the solution of 2.7 g. potassium hydroxide in 7 ml. methanol is added and the mixture is allowed to stand for 110 hours. It is evaporated in vacuo, the residue dissolved in water and the solution acidified with hydrochloric acid to pH 3. It is extracted 3 times with diethyl ether, the extract dried and evaporated. The residue is triturated with petroleum ether whereby crystallization occurs. The crystals are collected and recrystallized first from benzene-petroleum ether and then from aqueous ethanol to yield the α-[4-(1,2,3,4-tetrahydro-1-naphthyl)-phenoxy]-butyric acid of the formula

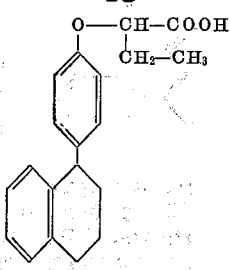

melting at 140–141° after drying for 5 hours at 80° in a high vacuum.

EXAMPLE 9

To the solution of 9.3 g. of 2-[4-(1,2,3,4-tetrahydro-naphthyl-1)-phenoxy]-isobutyric acid in 25 ml. toluene and 25 ml. dimethylformamide 1.5 g. of a 56% suspension sodium hydride in mineral oil are added during 15 minutes while stirring and then 18.0 ml. β-chloroethyl-diethyl-amine. The mixture is stirred for 3 hours whereby the initially formed solid dissolves. It is allowed to stir overnight at room temperature; some benzene is then added and the whole is evaporated in vacuo. The remaining brown liquid is extracted with diethyl ether, the extract dried and evaporated. The liquid residue is added to a solution of 5.2 g. citric acid in 50 ml. methyl ethyl ketone; the precipitate formed is filtered off and recrystallized from acetone yielding the 2-diethylamino-ethyl 2-[4-(1,2,3,4-tetrahydro-naphthyl-1)-phenoxy]-isobutyrate citrate of the formula

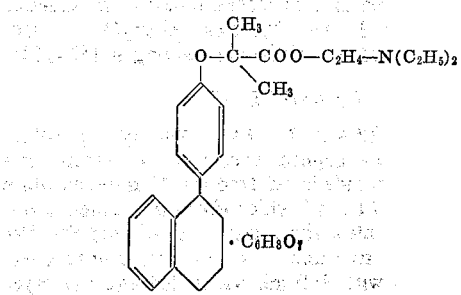

melting at 99–101° C.

EXAMPLE 10

2.1 g. 1-(4-hydroxy-phenyl)-indane (M.P. 88–89°) are dissolved in 50 ml. acetone and 2.0 g. sodium hydroxide are added while stirring and refluxing the solution. Hereupon 1.3 g. chloroform are added dropwise and after completed addition the mixture is refluxed for 2 hours. After cooling it is filtered, the residue suspended in 50 ml. water, the mixture acidified with concentrated hydrochloric acid, extracted with diethyl ether, the extract washed with brine, dried, filtered and evaporated. The residue is recrystallized from diethyl ether-hexane to yield the 2-(4-indanyl(1)-phenoxy)-isobutyric acid of the formula

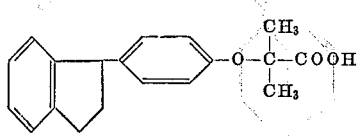

showing in the I.R.-spectrum inter alia bands at 1704, 820 and 740 cm.$^{-1}$.

EXAMPLE 11

The mixture of 2.38 g. 1-(4-hydroxy-phenyl)-benzo-suberane, 2.0 g. sodium hydroxide and 50 ml. acetone is stirred and refluxed for 10 minutes. Then 1.3 g. chloroform are added dropwise and the mixture refluxed for 2 hours. After cooling it is filtered, the residue suspended in 50 ml. water, the mixture acidified with concentrated hydrochloric acid, extracted with diethyl ether, the extract washed with brine, dried, filtered and evaporated. The residue is recrystallized from benzene-pentane to yield the 2-(4-benzosuberanyl(1)-phenoxy)-isobutyric acid of the formula

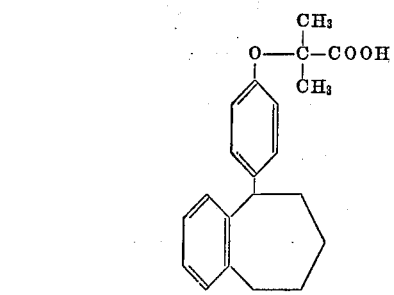

showing in the I.R.-spectrum inter alia bands at 1708, 830, 745 and 735 cm.$^{-1}$.

The starting material is prepared as follows:

The mixture of 16.2 g. benzasuberol, 9.4 g. phenol and 30 ml. benzene is added dropwise to the stirred solution of 7.0 g. aluminum chloride in 36 g. phenol while cooling. The mixture is then stirred at room temperature for four hours and then poured onto 50 g. ice and 40 ml. concentrated hydrochloric acid. It is extracted with ethyl acetate, the extract washed with water and brine, dried, filtered and evaporated in vacuo. The residue is distilled and the fraction boiling at 150–160°/0.1 mm. Hg collected; it represents the 1-(4-hydroxy-phenyl)-benzosu-berane.

EXAMPLE 12

Replacing in Example 10 the starting material by 2.6 g. 1-(4-hydroxy-phenyl)-6-methoxy- or 7-chloro- or 4,4-dimethyl-1,2,3,4-tetrahydro-naphthalene, and following the procedure given, the compounds of the formulae

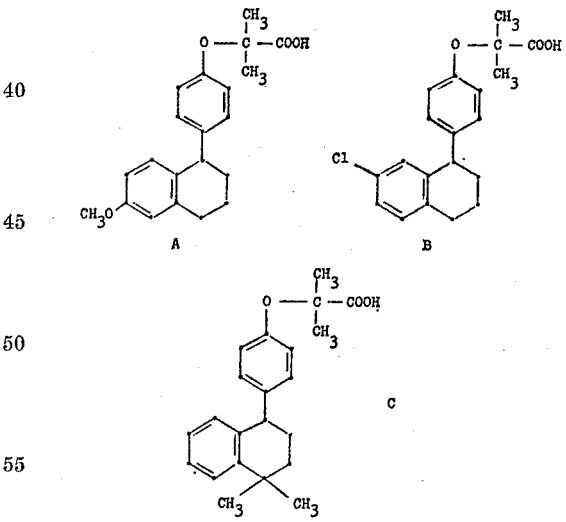

are obtained, showing in the I.R.-spectrum inter alia strong bands at 1350 cm.$^{-1}$(A) 810 cm.$^{-1}$(B) or 740 cm.$^{-1}$ (C) respectively.

EXAMPLE 13

1000 tablets each containing 10 mg. of the active ingredient

Formula:  
                                                            G.

2-[4-(1,2,3,4-tetrahydro-1-naphthyl)-phenoxy]-isobutyric acid _____ 10.0  
Lactose USP _____ 60.0  
Corn starch _____ 40.0  
Polyethylene glycol 6000 _____ 30.0  
Confectioners sugar _____ 50.0  
Magnesium stearate _____ 10.0  
Anhydrous ethanol, q.s.  
Deionized water, q.s.

Procedure

All the powders, except the polyethylene glycol, are passed through a screen with 0.3 mm. opening and mixed for 30 minutes. The polyethylene glycol is dissolved in the sufficient amount of 50% aqueous ethanol and with the solution the powders are wetted and mixed thoroughly. The granulate is dried with warm air, passed through a screen with 0.5 mm. opening and compressed into tablets using $10/_{32}''$ diameter dies, standard concave punches.

EXAMPLE 14

100 tablets each containing 0.5 g. of the active ingredient.

Formula:

| | G. |
|---|---|
| 2 - [4 - (6 - methoxy - 1,2,3,4 - tetrahydro-1-naphthyl) - phenoxy] - isobutyric acid | 500.0 |
| Microcrystalline cellulose | 109.0 |
| Polyethylene glycol 6000 powder | 18.0 |
| Polyvinyl alcohol powder | 18.0 |
| 5% aqueous ethanol, q.s. | |

Procedure

The isobutyric acid derivative and polyvinyl alcohol are passed through a screen with 0.3 mm. opening, mixed with the cellulose and the mixture is moistened with ethanol. The granulate is dried with warm air, passed through a screen with 0.5 mm. opening, mixed with polyethylene glycol and compressed into tablets using $14/_{32}''$ diameter dies, modified ball punches.

EXAMPLE 15

To the suspension of 0.6 g. 10% palladium charcoal and 50 ml. ethyl acetate, saturated with hydrogen, 1.0 g. 2-[4-(3,4-dihydro - 1 - naphthyl) - phenoxy] - isobutyric acid in 50 ml. ethyl acetate are added and the mixture is hydrogenated at atmospheric pressure and at room temperature until the hydrogen consumed ceases. The mixture is filtered, the filtrate evaporated under reduced pressure, and the residue recrystallized from diethyl ether-hexane to yield the 2-[4-(1,2,3,4-tetrahydro-1-naphahyl)-phenoxy]-isobutric acid melting at 131–132°; it is identical with the product obtained according to Example 2.

The starting material is prepared as follows: To the solution of 2.2 g. 1-(4-hydroxy-phenyl) - 3,4 - dihydronaphthalene in 50 ml. acetone, 2.0 g. sodium hydroxide are added while stirring and refluxing. Hereupon 1.3 g. chloroform are added dropwise and the mixture is refluxed for two hours. After cooling, it is filtered, the residue taken up in water, mixture acidified with hydrochloric acid and extracted with diethyl ether. The extract is washed with aqueous sodium bicarbonate, the aqueous layer separated, acidified with hydrochloric acid, extracted with diethyl ether, the extract dried and evaporated. The residue is recrystallized from ethyl acetate-hexane to yield the 2-[4-(3,4-dihydro-1-naphthyl)-phenoxy] - isobutyric acid, M.P. 112–113°.

EXAMPLE 16

To the solution of 10.0 g. 1 - (4 - hydroxy - phenyl)- 5 - methoxy - 1,2,3,4 - tetrahydro - naphthalene in 100 ml. acetone, 9.6 g. sodium hydroxide are added while refluxing, followed by 5.76 g. chloroform. After completed addition the mixture is refluxed for 5 hours during which time 350 ml. acetone are added portionwise in order to facilitate stirring. It is then filtered, the residue washed with acetone, suspended in water, the mixture acidified with hydrochloric acid and extracted with diethyl ether. The organic layer is washed with water, dried, filtered, and evaporated under reduced pressure. The residue is recrystallized first from hexane and then from hexane-benzene (3:1) to yield the 2 - [4 - (5 - methoxy-1,2,3,4 - tetrahydro - 1 - naphthyl) - phenoxy] - isobutyric acid of the formula

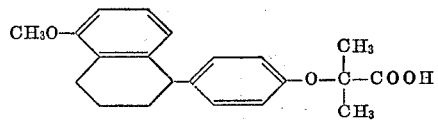

melting at 131–132°.

The starting material is prepared as follows: To the stirred solution of 52.8 g. 5-methoxy-tetralone (M.P. 83–87°) in 250 ml. ethanol, 10.0 g. sodium borohydride are added during ½ an hour and stirring is continued for 1 hour. Hereupon 15 ml. glacial acetic acid are added dropwise while cooling, followed by 200 ml. water. The mixture is stirred at room temperature for 1½ hours, filtered and the filtrate neutralized with sodium carbonate. It is evaporated in vacuo, the residue taken up in diethyl ether, the organic layer dried and evaporated to yield the 5 - methoxy - 1,2,3,4 - tetrahydro - 1 - naphthol melting at 75–78°.

To the solution of 9.4 g. thereof in 50 ml. hexane, the mixture of 6.7 g. aluminum chloride, 9.4 g. phenol and 25 ml. hexane is added while stirring and cooling. After completed addition the mixture is stirred for 1½ hours in the ice bath and 2 hours at room temperature. It is then poured over ice and 50 ml. concentrated hydrochloric acid and the mixture extracted with ethyl acetate. The organic layer is washed with 40 ml. 2 N hydrochloric acid, 150 ml. water, and 100 ml. saturated aqueous sodium bicarbonate, dried, filtered, and the filtrate evaporated. The residue is dissolved in hot benzene, the solution chilled, the precipitate filtered off and recrystallized from aqueous ethanol to yield the 1 - (4 - hydroxy - phenyl) - 5 - methoxy-1,2,3,4-tetrahydro-naphthalene melting at 152–153°.

EXAMPLE 17

The mixture of 29.4 g. 1 - (3 - hydroxy - phenyl)- 1,2,3,4 - tetrahydro - naphthalene, 300 ml. acetone and 52.8 g. sodium hydroxide is refluxed for 10 minutes while stirring. Hereupon 21.5 ml. chloroform are added dropwise during 40 minutes, the mixture is refluxed for 1½ hours and allowed to stand at room temperature overnight. It is diluted with 300 ml. water, the aqueous layer separated and washed with diethyl ether. It is acidified with concentrated hydrochloric acid and extracted with diethyl ether. The extract is washed with water, dried, filtered and evaporated. 41.0 g. of the residue are dissolved in 100 ml. acetone and 25 ml. cyclohexylamine in 100 ml. diethyl ether are added. The precipitate formed is filtered off, washed with acetone-diethyl ether (1:1) and recrystallized from acetone-ethanol-hexane, to yield the cyclohexylammonium 2 - [3 - (1,2,3,4 - tetrahydro - 1 - naphthyl)-phenoxy]-isobutyrate of the formula

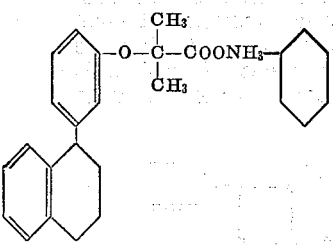

melting at 143°.

EXAMPLE 18

The mixture of 16 g. 1 - (2 - hydroxy - phenyl) - 1,2,3,4-tetrahydro-naphthalene, 200 ml. acetone and 25.6 g. sodium hydroxide is refluxed for 10 minutes while stirring. Hereupon 10.2 g. chloroform are added dropwise during 25 minutes and the whole is refluxed for 1½ hours while stirring. The mixture is cooled in an ice bath, filtered, the residue washed with acetone and the filtrate evaporated in vacuo. The residue is taken up in 200 ml. water, the solution washed with diethyl ether, acidified with concentrated hydrochloric acid and extracted with diethyl ether.

The extract is washed with water, dried, filtered and evaporated. The residue is taken up in hexane, the solution treated with charcoal, filtered and concentrated. The precipitate formed is filtered off and recrystallized from aqueous ethanol, to yield the 2 - [2 - (1,2,3,4 - tetrahydro-1-naphthyl) - phenoxy] - isobutyric acid melting at 131–132°.

6.5 g. thereof are dissolved in 25 ml. toluene and 15 ml. dimethylformamide and 1.0 g. 65% sodium hydride in mineral oil are added, followed by 3.0 g. 2-diethylaminoethyl chloride and the mixture is stirred at room temperature over night and finally refluxed for 6 hours. It is evaporated in vacuo, the residue taken up in water, the solution extracted with diethyl ether, the extract dried, filtered and evaporated. The residue is distilled and the fraction boiling at 110°/0.25 mm. Hg discarded. The residue is taken up in 20 ml. methyl ethyl ketone and 4.19 g. citric acid in the minimum amount of boiling methyl ethyl ketone are added. The precipitate formed is filtered off and recrystallized from acetone-diethyl ether, to yield the 2-diethylaminoethyl 2-[2-(1,2,3,4-tetrahydro-1-naphthyl)-phenoxy]-isobutyrate citrate of the formula

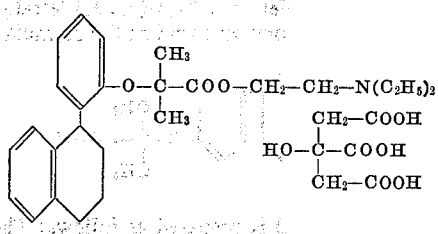

melting at 112–114°.

EXAMPLE 19

The mixture of 11.2 g. 1-(4-hydroxy-phenyl)-1,2,3,4-tetrahydro-naphthalene, 125 ml. xylene and 1.2 g. sodium is refluxed for 3 hours while stirring. Hereupon 12 g. ethyl γ-bromo-butyrate are slowly added and the mixture refluxed for 6 hours. After cooling 5 ml. methanol and 100 ml. water are added, the organic solution separated, dried, filtrated and evaporated in vacuo. The residue is taken up in the minimum amount of hot hexane, the precipitate formed after cooling filtered off and the filtrate evaporated in vacuo. The resdue is distilled and the fraction boiling at 165–180°/0.25 mm. Hg collected, it represents the ethyl γ-[4-(1,2,3,4-tetrahydro-1-naphthyl)-phenoxy]-butyrate of the formula

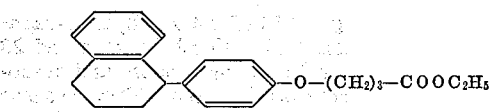

The mixture of 4.0 g. thereof, 25 ml. methanol and 1.0 g. potassium hydroxide is allowed to stand at room temperature for 20 hours. It is evaporated in vacuo, the residue taken up in water, the solution acidified with hydrochloric acid and extracted with ethyl acetate. The extract is dried, filtered, evaporated and the residue recrystallized from aqueous ethanol, to yield the corresponding free acid melting at 142–143°.

EXAMPLE 20

The mixture of 9.0 g. 1-(4-hydroxy-phenyl)-7-chloro-1,2,3,4-tetrahydro-naphthalene, 250 ml. acetone and 8.6 g. sodium hydroxide is refluxed for 10 minutes while stirring, whereupon 3.2 g. chloroform are added dropwise. The mixture is refluxed for 5 hours, filtered and the residue washed with acetone. The filtrate is diluted with water and washed with diethyl ether. The aqueous layer is separated, acidified with concentrated hydrochloric acid and extracted with diethyl ether. The extract is washed with water, dried, filtered and evaporated. The residue is recrystallized from hexane-diethyl ether, to yield the 2 - [4 - (7-chloro-1,2,3,4-tetrahydro-1-naphthyl)phenoxy] isobutyric acid of the formula

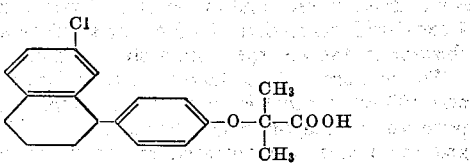

melting at 117–118°.

EXAMPLE 21

The mixture of 12 g. of 1-(4-hydroxy-phenyl)-7-trifluoromethyl-1,2,3,4-tetrahydro-naphthalene, 16 g. sodium hydroxide and 100 ml. acetone is refluxed while stirring. Hereupon the mixture of 8 g. chloroform and 20 ml. acetone is added dropwise and refluxing is continued for 2 hours. The mixture is filtered and the residue washed with acetone. It is suspended in 100 ml. water, the mixture acidified with 10 ml. hydrochloric acid and extracted with diethyl ether. The extract is washed with water, dried, filtered and evaporated, to yield the 2-[4-(7-trifluoromethyl-1,2,3,4-tetrahydro - 1 - naphthyl)-phenoxy]-isobutyric acid of the formula

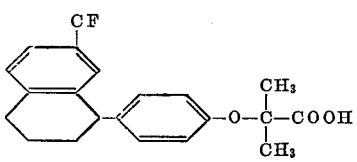

showing in the I.R.-spectrum a strong band at 1702 cm.$^{-1}$ and in the NMR-spectrum a signal at 1.68 δ.

The starting material is prepared as follows: Through the Grignard reagent, prepared from 45 g. 4-trifluoromethyl-bromobenzene, 4.9 g. magnesium chips and 300 ml. diethyl ether, 10 g. ethyleneoxide is bubbled at 5° C. while stirring, and stirring is continued 2 hours at room temperature. To the mixture an aqueous solution of ammonium chloride, 10 ml. acetic acid and 50 ml. water are added and the organic layer separated. The aqueous solution is extracted with diethyl ether and the combined organic phase washed with saturated aqueous sodium bicarbonate and brine. It is dried, filtered and evaporated in vacuo. The residue is distilled and the fraction boiling at 90–100°/0.3 mm. Hg collected; it represents the 2-(4-trifluoromethyl-phenyl)-ethanol.

The solution of 30 g. thereof, in 30 ml. benzene is added dropwise to the stirred solution of 25 g. phosphorus tribromide in 800 ml. benzene while cooling in an ice bath and stirring. Hereupon the mixture is heated to 60° for 4 hours. Upon cooling in an ice bath, 100 ml. ice water are added, the organic layer separated, washed with aqueous sodium bicarbonate, dried, filtered and evaporated in vacuo. The residue is distilled and the fraction boiling at 80–110°/0.2 mm. Hg collected; it represents the 2-(4-trifluoromethyl-phenyl)-ethyl bromide.

The solution of 35 g. thereof, in 100 ml. anhydrous ethanol is added dropwise to the mixture prepared from 3 g. sodium, 100 ml. anhydrous ethanol and 20 g. diethyl malonate and the mixture is refluxed for 5 hours. Thereafter, most of the ethanol is removed in vacuo, 200 ml. diethyl ether are added and the mixture is washed with water and brine. Upon removal of the diethyl ether, the residue is taken up in 200 ml. methanol, containing 20 g. potassium hydroxide, and the solution allowed to stand overnight. It is evaporated in vacuo, the residue dissolved in water and the solution acidified with concentrated hydrochloric acid. The mixture is extracted with diethyl ether, the extract evaporated and the residue heated in an oil bath at 120° and 100 mm. Hg, to yield the γ-(4-trifluoromethyl-phenyl)-butyric acid.

The mixture of 25 g. thereof, and 300 g. polyphosphoric acid is gradually heated to 110° while stirring and kept at this temperature for 45 minutes. The hot mixture is poured onto ice while stirring. It is extracted with diethyl ether, the extract washed with 2 N sodium carbonate and brine, dried, filtered and evaporated in vacuo, to yield the 1-oxo-7-trifluoromethyl - 1,2,3,4 - tetrahydro-naphthalene, showing in the I.R.-spectrum a strong band at 1685 cm.

The mixture of 15 g. thereof, 2 g. sodium borohydride and 100 ml. ethanol is stirred for 5 hours at room temperature. Thereupon, 5 ml. diluted acetic acid are added and the whole is evaporated in vacuo. To the residue water is added and the mixture extracted with diethyl ether. The extract is dried, filtered and evaporated, to yield the 1 - hydroxy-7-trifluoromethyl-1,2,3,4-tetrahydro-naphthalene.

The mixture of 14 g. thereof, 9 g. phenol and 20 ml. benzene is added dropwise to the solution of 6 g. of aluminum chloride in 30 ml. phenol, overlayed with 20 ml. hexane, while stirring and cooling in an ice bath. After completed addition, the mixture is stirred at room temperature for 3 hours and at 50° for 2 hours. The warm mixture is poured onto ice and concentrated hydrochloric acid and extracted with diethyl ether. The extract is dried, filtered and evaporated. The residue is distilled and the fraction boiling at 140°/13 mm. Hg discarded. The residue is further distilled at 160–180°/0.2 mm. Hg, to yield the 1-(4-hydrophenyl)-7-trifluoromethyl-1,2,3,4-tetrahydro-naphthalene.

EXAMPLE 22

The mixture of 18 g. 1-(4-hydroxy-phenyl)-5-methyl-1,2,3,4-tetrahydro-naphthalene, 20 g. sodium hydroxide and 150 ml. acetone is heated under gentle reflux. Hereupon the mixture of 10 g. chloroform and 20 ml. acetone is added dropwise while stirring and refluxing is continued for 2 hours. After cooling, the mixture is filtered, the residue washed with acetone and suspended in water. The mixture is acidified with hydrochloric acid, extracted with diethyl ether and the extract dried, filtered and evaporated in vacuo, to yield the 2-[4-(5-methyl-1,2,3,4-tetrahydro-1-naphthyl)-phenoxy]-isobutyric acid of the formula

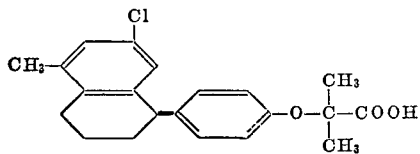

showing in the I.R.-spectrum a strong band at 1705 cm.$^{-1}$ and in the NMR-spectrum a signal at 2.25 δ.

The starting material is prepared as follows: The mixture of 16 g. 1-oxo-5-methyl-1,2,3,4-tetrahydro-naphthalene (Helv. Chim. Acta 20, 1155, 1932) 5 g. sodium borohydride and 200 ml. 95% ethanol is stirred at room temperature for 5 hours. Hereupon 10 ml. diluted acetic acid are added and the whole evaporated in vacuo. The residue is taken up in water, the mixture extracted with diethyl ether, the extract dried, filtered and evaporated, to yield the 1 - hydroxy-5-methyl - 1,2,3,4 - tetrahydronaphthalene.

The mixture of 16 g. thereof, 9 g. phenol, 20 ml. benzene and 20 ml. hexane is added dropwise to the solution of 7 g. aluminum chloride in 30 g. phenol, overlayed with 50 ml. benzene-hexane (1:1) while stirring at 5°, and stirring is continued for 2 hours at 50°. The mixture is poured onto ice and concentrated hydrochloric acid, the whole extracted with diethyl ether, the extract dried, filtered and evaporated. The residue is distilled and the fraction boiling at 150–170°/0.15 mm. Hg collected; it represents the 1-(4-hydroxy-phenyl) - 5 - methyl - 1,2,3,4-tetrahydronaphthalene.

EXAMPLE 23

Analogous to the method shown in Example 6 also the ethyl 2-[4-(1,2,3,4 - tetrahydro-1-naphthyl)-phenoxy]-isobutyrate is obtained, which is identical with the compound obtained according to Example 1.

The starting material is prepared as follows: The mixture of 2.5 g. 1-(4-hydroxy-phenyl)-3,4-dihydro-naphthalene, 0.3 g. sodium and 100 ml. xylene is refluxed for 3 hours while stirring. Hereupon 2.2 g. ethyl 2-bromo-isobutyrate are added dropwise and refluxing is continued for 6 hours. The mixture is filtered, the filtrate evaporated in vacuo, the residue taken up in water and the mixture extracted with diethyl ether. The extract is dried, filtered and evaporated, the residue distilled and the fraction boiling at 175–180°/0.24 mm. Hg collected; it represents the ethyl 2-[4-(3,4-dihydro-1-naphthyl)-phenoxy] - isobutyrate.

EXAMPLE 24

The mixture of 13 g. 2-(4-hydroxy-phenyl)-1,2,3,4-tetrahydro-naphthalene, 150 ml. acetone and 16.3 g. sodium hydroxide is refluxed one half hour while stirring. Hereupon 10.8 g. chloroform are added dropwise and the mixture refluxed for 2 hours, during which time 200 ml. acetone are added, in order to facilitate stirring. It is filtered, the residue washed with acetone, dissolved in water, the solution acidified with hydrochloric acid and the precipitate formed filtered off. It is recrystallized from aqueous ethanol, to yield the 2-[4-(1,2,3,4-tetrahydro-2-naphthyl)-phenoxy]-isobutyric acid of the formula

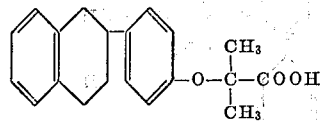

melting at 128–129°.

The starting material is prepared as follows: The mixture of 18.7 g. 1-oxo-2-(4-methoxy-phenyl)-1,2,3,4-tetrahydronaphthalene, 9.65 g. sodium hydroxide, 150 ml. diethylene glycol and 9.65 ml. hydrazine hydrate is refluxed for 1 hour while stirring, then partially distilled until the vapor reaches 205°, and refluxed for 3 more hours. It is poured into water, filtered and the residue washed with water, to yield the 2-(4-methoxy-phenyl)-1,2,3,4-tetrahydro-naphthalene melting at 75–77°.

13.6 g. thereof are added portionwise to the melt, obtained from 175 ml. concentrated hydrochloric acid and 160 ml. pyridine, at 210° and the mixture is refluxed for 30 minutes. It is poured onto ice, the residue formed filtered off and recrystallized from aqueous ethanol, to yield the 2-(4-hydroxy-phenyl) - 1,2,3,4-tetrahydro-naphthalene melting at 114–115°.

EXAMPLE 25

The mixture of 20 g. 2-[4-(1,2,3,4-tetrahydro-1-naphthyl)-phenoxy]-isobutyric acid, 100 ml. benzene and 20 ml. thionyl chloride is refluxed for 3 hours and evaporated in vacuo. The residue is taken up in 100 ml. benzene and the solution obtained divided into 3 equal volumes. To the first 33 ml. solution A, a saturated solution of ammonia in dioxane is added until the mixture remains basic. The second solution B is made basic with a saturated solution of diethylamine in benzene, and the third solution C is made basic with a saturated solution of 3-azabicyclo-[3,2,2]-nonane in benzene-pyridine 4:1. The mixtures are allowed to stand at room temperature overnight and are then washed with water, 2 N hydrochloric acid, aqueous sodium carbonate and brine, dried, filtered and evaporated.

The residue obtained from solution A is recrystallized from 95% aqueous ethanol, to yield the 2-[4-(1,2,3,4-tetrahydro-1-naphthyl)-phenoxy]-isobutyric acid amide of the formula

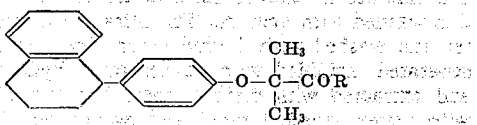

in which R stands for —NH$_2$, melting at 170–172°.

The residue obtained from solution B is distilled in vacuo and the fraction boiling at 195°/0.2 mm. Hg represents the compound of the above formula in which R stands for —N($C_2H_5$)$_2$.

The residue obtained from solution C is taken up in the minimum amount of benzene, the solution put on a column of 500 g. neutral alumina (Woelm Activity III) and the column is eluted with benzene-hexane 1:1, to yield the compound of the above formula in which R represents

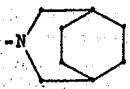 melting at 91–95°.

EXAMPLE 26

To the solution of 22.4 g. 1-(4-hydroxy-phenyl)-1,2,3,4-tetrahydro-naphthalene in 250 ml. xylene, 2.3 g. sodium are added portionwise and the mixture refluxed for 3 hours while stirring. After cooling, 18.5 g. ethyl α-bromo-propionate are added dropwise and the mixture refluxed for 6 hours. After cooling, water is added, the organic layer separated, dried, filtered and evaporated in vacuo. The residue is taken up in 50 ml. methanol and the solution added to the mixture of 13.5 g. potassium hydroxide and 250 ml. methanol. The mixture is allowed to stand at room temperature for 18 hours and is evaporated in vacuo. The residue is taken up in water, the solution washed with diethyl ether, acidified with concentrated hydrochloric acid and extracted with diethyl ether. The extract is washed with water, dried, filtered and evaporated. The residue is first recrystallized from n-heptane, then from benzene-petroleum ether, and finally from aqueous ethanol to yield the α-[4-(1,2,3,4-tetrahydro-1-naphthyl)-phenoxy]-propionic acid of the formula

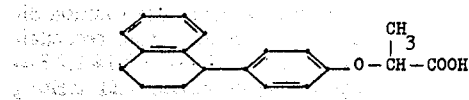

melting at 124–126°.

From the n-heptane mother liquor, another crop of a different morphological form of this compound is obtained, melting at 99–103° after recrystallization from aqueous acetic acid.

EXAMPLE 27

To the solution of 8.8 g. 1-(4-hydroxy-phenyl)-7-cyclohexyl-1,2,3,4-tetrahydro-naphthalene, 50 ml. acetone and 8.1 g. sodium hydroxide, the mixture of 5.36 g. chloroform and 6 ml. acetone is added dropwise while stirring. The mixture is diluted with 25 ml. acetone and refluxed for 30 minutes while stirring. After cooling, it is filtered, the residue washed with acetone and dissolved in the minimum amount of water. The solution is acidified with 2 N hydrochloric acid and extracted with diethyl ether-ethyl acetate. The extract is washed with water and brine, dried, filtered and evaporated in vacuo. The residue is recrystallized from pentane, to yield the 2-[4-(7-cyclohexyl-1,2,3,4-tetrahydro-1-naphthyl)-phenoxy]-isobutyric acid of the formula

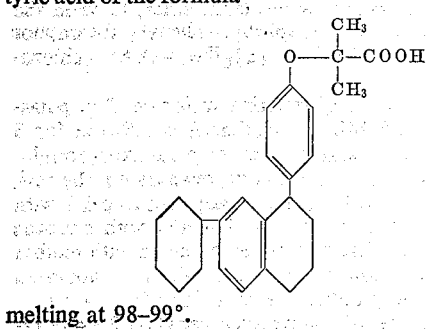

melting at 98–99°.

The starting material is prepared as follows: To the mixture of 832 g. aluminum chloride and 1.85 liters nitrobenzene, the mixture of 305 g. succinic acid anhydride, 480 g. cyclohexylbenzene and 750 ml. nitrobenzene is added while stirring and cooling. The mixture is stirred for 5 hours at room temperature and allowed to stand overnight. It is poured onto ice and concentrated hydrochloric acid, and the precipitate formed filtered off, washed with hexane and recrystallized from benzene-diethyl ether-ethyl acetate solution to yield a first crop melting at 128–130°. The nitrobenzene filtrate is steam distilled and the mother liquor evaporated in vacuo to yield 2 other crops of material which are combined, triturated with pentane and recrystallized from aqueous ethanol. All crops are combined, dissolved in hot benzene, the solution treated with charcoal, filtered and, after cooling, the β-(4-cyclohexyl-benzoyl)-propionic acid crystallizes; it melts at 133–135° after recrystallization from aqueous ethanol.

450 g. thereof are hydrogenated in 2.2 liters acetone over 45 g. 10% palladium on charcoal until the theoretical amount of hydrogen has been absorbed. The mixture is filtered and the filtrate evaporated, to yield the γ-(4-cyclohexyl-phenyl)-butyric acid melting at 45–47°.

The mixture of 314 g. thereof and 1.75 kg. polyphosphoric acid is heated at the steam bath for 1 hour while stirring. After cooling, it is poured into water, the precipitate formed filtered off and washed with water to yield the 1-oxo-7-cyclohexyl-1,2,3,4-tetrahydro-napthalene melting at 47–49°.

To the solution of 45.6 g. thereof in 200 ml. ethanol and 100 ml. tetrahydrofuran, 7.6 sodium borohydride are added portionwise while stirring and stirring is continued for 6 hours at room temperature. To the mixture, 1 ml. aqueous acetic acid is added and the whole is evaporated in vacuo. The residue is triturated with water, filtered off and recrystallized from aqueous ethanol, to yield the 1-hydroxy-7-cyclohexyl-1,2,3,4-tetrahydro-naphthalene melting at 85–87°.

The solution of 15.0 g. thereof in 190 ml. benzene, 63 ml. hexane and 6.5 g. phenol, is added dropwise to the mixture of 13.0 g. phenol and 4.3 g. aluminum chloride while stirring and stirring is continued for 5 hours at room temperature. The resulting mixture is filtered, the residue washed with hexane and suspended in aqueous hydrochloric acid. It is again filtered off and washed with water, to yield a first crop of material. The combined filtrates are extracted with diethyl ether, the extract washed with water and brine, dried, filtered and evaporated in vacuo. The residue is triturated with hexane, filtered and the residue washed with hexane. Both crops obtained are combined and recrystallized from benzene-hexane, to yield the 1-(4-hydroxy-phenyl)-7-cyclohexyl-1,2,3,4-tetrahydro-naphthalene melting at 153–156°.

EXAMPLE 28

To the refluxing mixture of 14 g. 1-(4-hydroxy-phenyl)-1,2,3,4-tetrahydro-naphthalene, 25 g. sodium hydroxide and 325 ml. acetone, 17 g. chloroform in 75 ml. acetone are added while stirring, at a rate to maintain gentle reflux. Hereupon the mixture is refluxed and stirred for 2 hours and 180 ml. acetone are finally distilled off. The concentrate is diluted with 125 ml. water and the remaining acetone distilled off in vacuo, until the concentrate's volume is about 140 ml. It is diluted with 375 ml. water, heated to 65° and about 65 ml. acetone are added in order to dissolve the precipitated salts. The solution is filtered, the filter washed with 30 ml. acetone, the filtrate heated to 70° and acidified with 20.3 g. 36% hydrochloric acid to pH=1. The mixture is stirred overnight while slowly cooling to about 10°. It is filtered, the residue washed with 50 ml. water and 20 ml. n-heptane and dried in vacuo at 60°. 38 g. of the residue are taken up in 124 ml. hot toluene, the solution is filtered and the filtrate slowly cooled overnight to about −10°. The precipitate formed is filtered off and washed with 50 ml. cold toluene, to yield the 2 - [4-(1,2,3,4-tetrahydro-1-naphthyl)-phenoxy]-isobutyric acid melting at 127–128°; it is identical with the product obtained according to Example 2, 5 or 15.

The starting material is prepared as follows: To the refluxing mixture of 670 ml. benzene, and 552 g. aluminum chloride, the solution of 113.5 g. γ-butyrolactone in 580 benzene is added while stirring at such a rate to maintain gentle reflux. The mixture is refluxed for 5 hours and stirred overnight at room temperature. It is poured over 862 g. ice and 136 ml. 36% hydrochloric acid while stirring, and about 1 kg. more ice is added in order to maintain the temperature at about 0°. The organic phase is separated, washed with the mixture of 240 ml. water and 14 ml. 36% hydrochloric acid and evaporated in vacuo. The residue is distilled and the fraction boiling at 118–133°/63 mm. Hg collected, to yield the 1-oxo-1,2,3,4-tetrahydronaphthalene.

60.65 g. thereof are added to the stirred mixture of 300 ml. anhydrous ethanol and 10 g. sodium borohydride at such a rate to maintain the temperature below 50°. Hereupon the mixture is refluxed for 3 hours and stirred overnight at room temperature. It is combined with 144 ml. 15% acetic acid and concentrated to about 194 ml. at atmosphereic pressure. The concentrate is cooled to 30°, diluted with 200 ml. water and 120 ml. methylene chloride. The organic phase is separated, washed with 180 ml. water and evaporated in vacuo, to yield the 1,2,3,4-tetrahydronaphthol.

The mixture of 175 g. thereof and 123 g. phenol is added to the stirred mixture of 81.5 g. aluminum chloride and 122 g. phenol at such a rate to maintain the temperature below 40°. It is then stirred at 50–55° for 4 hours and at room temperature overnight. Hereupon it is poured over 445 g. ice and 298 ml. 36% hydrochloric acid at such rate to maintain the temperature below 25° with external cooling. To the suspension obtained, 30 ml. benzene and 913 ml. ethyl acetate are added and the organic phase is separated. It is washed two times with 290 ml. water and evaporated in vacuo. The residue is taken up in the hot mixture of 398 ml. methylene chloride and 332 g. n-heptane and the solution slowly cooled overnight while stirring. It is finally cooled to —10°, the precipitate formed filtered off and washed with 20 ml. cold n-heptane-methylene chloride 2:1, to yield the 1-(4-hydroxyphenyl)-1,2,3,4-tetrahydro-naphthalene melting at 120–123°.

EXAMPLE 29

The mixture of 20 g. 2-[4-(1,2,3,4-tetrahydro-1-naphthyl)-phenoxy]-isobutyric acid and 17 ml. thionyl chloride is refluxed for 2 hours and evaporated in vacuo. The residue is taken up repeatedly in benzene and the solution again evaporated. The residue is taken up in 25 ml. benzene and the solution of 7.4 g. 1-methyl-4-hydroxy-piperidine is added and the mixture refluxed for 1 hour. It is cooled, filtered, the residue washed with diethyl ether and the filtrate evaporated in vacuo. The residue is taken up in diethyl ether, the solution extracted with 2 N hydrochloric acid and the extract made basic with saturated aqueous ammonium hydroxide. It is extracted with diethyl ether, the extract washed with water and brine, dried, filtered, and evaporated. The residue is taken up in methyl ethyl ketone, and the solution combined with 11.5 g. citric acid in same solvent, to yield the 1-methyl-4-piperidyl 2-[4-(1,2,3,4-tetrahydro-1-naphthyl)-phenoxy]-isobutyrate citrate of the formula

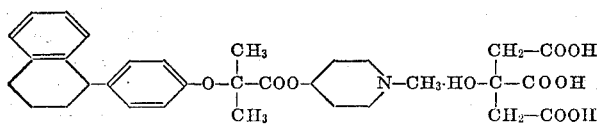

melting at 123–125° after recrystallization from methyl ethyl ketone and acetone.

EXAMPLE 30

The mixture of 20 g. 2-[4-(1,2,3,4-tetrahydro-1-naphthyl)-4-phenoxy]-isobutyric acid, 20 ml. thionyl chloride and 100 ml. benzene is refluxed for 4 hours, allowed to stand overnight and evaporated in vacuo. The residue is taken up twice in 50 ml. benzene and the solution again evaporated. The residue is taken up in 100 ml. benzene and 8.4 g. 3-pyridyl-carbinol are added. After standing overnight, the precipitate formed is filtered off, the filtrate evaporated and the residue taken up in benzene-hexane (1:1). The solution is chromatographed on alumina (Activity III) and eluted with benzene-hexane (1:1). The last factions containing about 50% of the material are collected and evaporated, to yield the 3-piperidylmethyl 2-[4-(1,2,3,4-tetrahydro-1-naphthyl)-phenoxy] - isobutyrate of the formula

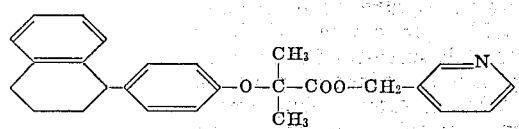

showing in the I.R. spectrum inter alia bands at 1736, 1538, 1160, 738 and 770 cm.$^{-2}$.

EXAMPLE 31

The mixture of 1.12 g. 1-1-(4-hydroxyphenyl)-1,2,3,4-tetrahydronaphthalene, 25 ml. acetone and 1.7 g. sodium hydroxide is refluxed for 15 minutes while stirring. Hereupon the solution of 1 g. chloroform in 4 ml. acetone is added during 15 minutes, and refluxing and stirring is continued for 1 hour. The mixture is cooled, filtered, the residue washed with acetone and taken up in 2 N hydrochloric acid. The mixture is extracted with diethyl ether, the extract washed with water, dried, filtered and evaporated. The residue is taken up in diethyl ether, the solution diluted with hexane and the precipitate formed recrystallized from benzene-hexane, to yield the l-2-[4-1,2,3,4-tetrahydro-1-naphthyl)-phenoxy]-isobutyric acid melting at 118–119°, $[\alpha]_D^{25}=-27°$ (methanol).

The analogously prepared dextro-rotatory antipode melts at 118°, $[\alpha]_D^{25}=+27°$ (methanol).

The starting material is prepared as follows: To the solution of 20 g. d,l-1-(4-hydroxyphenyl)-1,2,3,4-tetrahydronaphthalene in 25 ml. acetone, the mixture of 4.4 g. sodium hydroxide, 30 ml. water and 25 g. d-camphor sulfonyl chloride is added in 2 ml. portions during 30 minutes while stirring and diluted with 25 ml. more acetone. The whole is refluxed for 20 minutes and, as soon as the mixture becomes acidic, sodium carbonate is added to adjust the pH to about neutral. It is evaporated in vacuo, the residue taken up in water, the mixture extracted with diethyl ether and the extract dried, filtered and vaporated. The residue is taken up in 300 ml. methanol and the solution allowed to stand in the refrigerator. The precipitate formed is filtered off and recrystallized several times from methanol, to yield the l-[4,(1,2,3,4-tetrahydro-1-naphthyl) phenyl] d-camphor sulfonate melting at 115–117°, $[\alpha]_D^{25}=+20.0°$ (chloroform). All the filtrates obtained are collected, evaporated and the residue recrystallized several times from benzene-petroleum ether, to yield the d - [4-[1,2,3,4-tetrahydro-1-naphthyl)-phenyl] d-camphor sulfonate melting at 91–92°, $[\alpha]_D^{25}=+38.8°$ (chloroform).

The mixture of 4 g. high-melting sulfonate, 2 g. potassium hydroxide and 140 ml. methanol is refluxed for 3 hours and allowed to stand at room temperature overnight. It is again refluxed for 1 more hour, evaporated, the residue taken up in water, the solution adjusted to pH 7 with concentrated hydrochloric acid and finally with aqueous sodium bicarbonate. The mixture is extracted with diethyl ether, the extract washed with water, dried, evaporated and the residue recrystallized several times from aqueous ethanol, to yield the 1-1-(4-hydroxyphenyl)-1,2,3,4-tetrahydronaphthalene melting at 135–135.5°, $[\alpha]_D^{25} = -27.8°$ (methanol).

The lower melting sulfonate is analogously saponified, to yield the d-1-(4-hydroxyphenyl) - 1,2,3,4 - tetrahydronaphthalene melting at 134–135°, $[\alpha]_D^{25} = +26.6°$ (methanol).

EXAMPLE 32

Preparation of 1000 tablets, each containing 50 mg. of the active ingredient:

| Formula: | G. |
|---|---|
| 2-[4-(1,2,3,4 - tetrahydro - 1 - naphthyl)-phenoxy]-isobutyric acid | 33.0 |
| Lactose U.S.P. | 51.7 |
| Corn starch | 13.0 |
| Stearic acid | 1.0 |
| Magnesium stearate | 1.0 |
| Colloidal silica | 0.3 |
| Purified water, q.s. | |

Procedure

All the powders are passed separately through a screen with 0.3 mm. openings and mixed well. From one-third of the starch and a suitable amount of water, a paste is formed in order to granulate the powders of the active ingredient, the lactose and one-third of the starch, if necessary, with an additional amount of water. The granulate is dried overnight at 35°, broken on a screen with 1.2 mm. openings, mixed with the remainder of the starch, the stearic acid, magnesium stearate and colloidal silica, and compressed into 150 mg. tablets using concave punches with 7.1 mm. diameter, uppers bisected.

EXAMPLE 33

Preparation of 1000 tablets each containing 100 mg. of the active ingredient:

| Formula: | G. |
|---|---|
| 2-[4-(1,2,3,4 - tetrahydro - 1 - naphthyl)-phenoxy]-isobutyric acid | 33.3 |
| Lactose U.S.P. | 50.4 |
| Corn starch | 10.0 |
| Colloidal silica | 3.3 |
| Gelatin | 1.0 |
| Stearic acid | 1.0 |
| Magnesium stearate | 1.0 |
| Purified water, q.s. | |

Procedure

All the powders are passed separately through a screen with 0.3 mm. openings. Then the active ingredient, the lactose, 6 g. of the starch and 3 g. of the colloidal silica are granulated with a sufficient amount of water containing the gelatin. The granulate is dried with warm air, broken on a screen with 1.2 mm. openings, blended with the remainder of the starch and colloidal silica as well as with the stearic acid and magnesium stearate, and 300 mg. of the granulate is compressed into tablets using concave punches with 9.5 mm. diameter, uppers bisected.

EXAMPLE 34

To the suspension of 0.3 g. 10% palladium charcoal and 25 ml. ethyl acetate, saturated with hydrogen, 0.5 g. 2-[4-(1,2-dihydro-1-naphthyl)-phenoxy]-isobutyric acid in 25 ml. ethyl acetate are added and the mixture is hydrogenated at atmospheric pressure and at room temperature until the hydrogen consumed ceases. The mixture is filtered, the filtrate evaporated under reduced pressure and the residue recrystallized from diethyl ether-hexane, to yield the 2-[4-(1,2,3,4-tetrahydro-1-naphthyl)phenoxy]-isobutyric acid melting at 128–131°; it is identical with the product obtained according to Examples 2, 5, 15 or 28.

The starting material is prepared as follows: To the mixture of 30.7 g. 1-oxo-4-phenyl-1,2,3,4-tetrahydronaphthalene and 32 ml. acetic anhydride, the solution of 6.4 ml. fuming nitric acid in 10 ml. acetic anhydride is added dropwise while stirring and cooling with an ice bath. The mixture is allowed to stand at room temperature overnight, poured onto ice, extracted with diethyl ether, the extract washed with aqueous sodium bicarbonate, dried and evaporated. The mixture of 27 g. of the residue, 27 g. hydroxylamine hydrochloride and 250 ml. pyridine is refluxed for 18 hours and evaporated in vacuo. The residue is taken up in water, the mixture extracted with diethyl ether, the extract washed with water, dried, evaporated and the residue recrystallized from ethanol to yield the oxime of the 1-oxo-4-(4-nitrophenyl)-1,2,3,4-tetrahydronaphthalene, melting at 208 to 212°.

The mixture of 5.8 g. thereof and 50 ml. 6 N hydrochloric acid is refluxed for three hours, diluted with water and extracted with ethyl acetate. The extract is dried, evaporated and the residue recrystallized from aqueous ethanol, to yield the corresponding free ketone melting at 130 to 132°.

The solution of 3.7 g. thereof in 100 ml. 95% aqueous ethanol is hydrogenated over 0.4 g. 10% palladium on charcoal at room temperature at 3 at. The mixture is filtered, the filtrate concentrated and the precipitate formed in the cold filtered off, to yield the 1-oxo-4-(4-aminophenyl)-1,2,3,4-tetrahydronaphthalene melting at 130 to 136°.

The solution of 2.8 g. thereof in 3 ml. dioxane, 3.5 ml. water and 2.6 ml. concentrated sulfuric acid is diazotized with the use of 0.825 g. sodium nitrite in 2 ml. water at 0°. The diazonium salt solution obtained is added dropwise to the boiling mixture of 8 ml. concentrated sulfuric acid and 6 ml. water during 30 minutes and the mixture poured over ice. It is extracted with chloroform, the extract dried, evaporated, the residue recrystallized from diethyl ether-hexane and sublimed at 0.3 mm. Hg, to yield the 1 - oxo - 4-(4-hydroxyphenyl)-1,2,3,4-tetrahydronaphthalene melting at 148 to 151°.

The mixture of 0.8 g. thereof, 0.16 g. 56% sodium hydride in mineral oil and 35 ml. xylene is stirred at the steam bath until the hydrogen evolution ceases. Hereupon 0.668 g. ethyl 2-bromo-isobutyrate are added and the mixture refluxed for 6 hours. It is filtered, the filtrate evaporated in vacuo, the residue distilled and the fraction boiling at 185–200°/0.35 mm. Hg collected. It is taken up in diethyl ether, the mixture filtered and the filtrate evaporated, to yield the ethyl 2-[4-(4-oxo-1,2,3,4-tetrahydro-1-naphthyl)-phenoxy]-isobutyrate showing in the I.R.-spectrum strong bands at 1720 and 1670 cm.$^1$.

The mixture of 0.8 g. thereof, 0.25 g. potassium hydroxide and 8 ml. methanol is allowed to stand overnight at room temperature and is evaporated in vacuo. The residue is taken up in water, the solution washed with hexane, the aqueous phase acidified with hydrochloric acid and extracted with diethyl ether. The extract is shaken with aqueous sodium bicarbonate, the aqueous solution again acidified with hydrochloric acid, extracted with diethyl ether and the extract evaporated, to yield the corresponding free acid.

The mixture of 0.5 g. thereof, 5 ml. 95% ethanol and 0.1 g. sodium borohydride is stirred at room temperature for 5 hours. After the addition of a few drops acetic acid, the mixture is evaporated in vacuo, the residue taken up in water and the mixture extracted with chloroform. The extract is dried, filtered and evaporated to yield the 2-[4-(4 - hydroxy - 1,2,3,4 - tetrahydro-1-naphthyl)-phenoxy]-isobutyric acid showing the U.V.-spectrum maxima at 224 m$\mu$ (E=15,790) and 274 m$\mu$ (E=1,480).

The mixture of 0.5 g. thereof and 10 ml. 90% aqueous formic acid is refluxed for 2 hours and slowly evaporated. The residue is taken up in water, the mixture extracted with diethyl ether, the extract washed with water, dried and evaporated, to yield the 2-[4-(1,2-dihydro-1-naphthyl)-phenoxy]-isobutyric acid.

Instead of using said acid in the above reduction, the mixture of 0.5 g. thereof, 0.5 ml. thionyl chloride and 5 ml. benzene is refluxed for 4 hours and evaporated in vacuo. The residue is taken up twice in 5 ml. benzene and the solution again evaporated. The residue is taken up in 5 ml. dry n-butanol and the solution slowly evaporated. The residue is taken up in 10 ml. chloroform, the solution washed with aqueous sodium bicarbonate, dried and concentrated to about 2 ml. The ice cold concentrate is combined with the cold solution of 0.5 g. 3-chloro-perbenzoic acid in 2 ml. chloroform and the mixture stirred for 1 hour in an ice bath. After standing for 24 hours in the refrigerator, it is diluted with 16 ml. chloroform, washed with cold aqueous sodium carbonate and brine, dried and evaporated, to yield the n-butyl 2-[4-(3,4-epoxy-1,2,3,4-tetrahydro-1-naphthyl)-phenoxy]-isobutyrate.

0.4 g. thereof are taken up in 0.1 N 95% aqueous ethanolic hydrochloric acid and the solution allowed to stand overnight at room temperature. It is evaporated in vacuo, the residue taken up in 10 ml. ethanol, the solution combined with 5 ml. 2 N aqueous potassium hydroxide, the mixture allowed to stand at room temperature overnight and slowly concentrated. The concentrate is diluted with 5 ml. water, washed with diethyl ether, the aqueous phase acidified with hydrochloric acid and extracted with diethyl ether. The extract is washed with brine, dried and evaporated, to yield the 2-[4-(trans-3,4-dihydroxy-1,2,3,4-tetrahydro-1-naphthyl)-phenoxy]-isobutyric acid showing in the U.V.-spectrum maxima at 267 m$\mu$ (E=1,310) and 283 m$\mu$ (E=910). The corresponding cis-3,4-dihydroxy compound can be obtained directly from said 2-[4-(1,2-dihydro-1-naphthyl)-phenoxy]-isobutyric acid or its n-butyl ester by oxidation with osmium tetroxide.

EXAMPLE 35

12.8 g. hydroxylamine hydrochloride are dissolved in 67 ml. hot methanol and 15.3 g. potassium hydroxide in 38 ml. hot methanol, and both solutions combined while maintaining a temperature between 30 and 40° by cooling and stirring. The resulting mixture is cooled in an ice bath for 5 minutes, the solution of 30.4 g. ethyl 2[4-(1,2,3,4-tetrahydro-1-naphthyl)-phenoxy]-isobutyrate in 25 ml. methanol is added and the whole shaken well for 1 minute. It is filtered, the residue washed with methanol and the filtrate allowed to stand at room temperature for 2 days. It is evaporated in vacuo, the residue suspended in 150 ml. 1.25 N aqueous acetic acid, the mixture heated at the steam bath for 5 minutes, cooled and extracted with diethyl ether. The extract is washed with water and brine, dried, filtered, evaporated and the residue recrystallized from benzene-hexane and aqueous ethanol, to yield the 2-[4 - (1,2,3,4 - tetrahydro-1-naphthyl)-phenoxy]-isobutyrohydroxamic acid of the formula

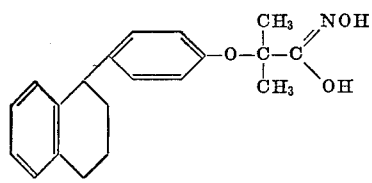

melting at 131–132°.

I claim:
1. A phenoxy-aliphatic acid having the formula

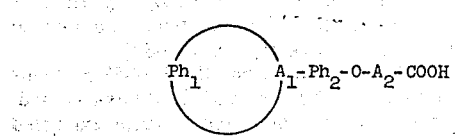

in which $Ph_1$ is 1,2 - phenylene, (lower alkyl) - 1,2-phenylene, (3 to 8 ring-membered cycloalkyl) - 1,2-phenylene, (lower alkoxy) - 1,2 - phenylene, (halogeno)-1,2 - phenylene or (trifluoromethyl) - 1,2 - phenylene, $Ph_2$ is 1,2-, 1,3- or 1,4-phenylene, (lower alkyl)-1,2-, 1,3- or 1,4-phenylene, (lower alkoxy) - 1,2-, 1,3- or 1,4-phenylene, (halogeno)-1,2-, 1,3- or 1,4 - phenylene or (trifluoromethyl) - 1,2-, 1,3- or 1,4-phenylene, $A_1$ is lower alkylene forming with $Ph_1$ a 5 to 7 membered ring carrying $Ph_2$ at one ring-carbon atom thereof and $A_2$ is lower alkylene or 3 to 8 ring-membered 1,1 - cycloalkylidene, or the lower alkyl, lower alkoxy-lower alkyl, $HPh_2$-lower alkyl, pyridyl-lower alkyl, Am-lower alkyl, 5 or 6 ring-membered monoazacycloalkyl or monoazacycloalkyl-lower alkyl esters thereof, wherein alkoxy, Am or the aza-nitrogen is separated from the carboxy oxygen by at least 2 carbon atoms and Am is di-lower alkylamino, lower alkyleneimino, piperazino, 4-lower alkylpiperazino or morpholino, the amide, mono- or di-lower alkylamides, mono- or bicyclic lower alkyleneamides, the hydroxamic acid, ammonium, alkali metal or alkaline earth metal salts thereof or pharmaceutically acceptable acid addition salts of the basic esters.

2. A compound as claimed in claim 1 in which Formula $Ph_1$ represents 1,2-phenylene, (lower alkyl)-1,2-phenylene, (5 to 7 ring-membered cycloalkyl) - 1,2-phenylene, (lower alkoxy) - 1,2 - phenylene, (halogeno) - 1,2-phenylene or (trifluoromethyl) - 1,2 - phenylene, $Ph_2$ is 1,2-, 1,3- or 1,4 - phenylene, (lower alkyl) - 1,2-, 1,3- or 1,4-phenylene, (lower alkoxy) - 1,2-, 1,3- or 1,4-phenylene or (trifluoromethyl) - 1,2-, 1,3- or 1,4 - phenylene, $A_1$ is lower alkylene forming with $Ph_1$ a 5 to 7 membered ring carrying $Ph_2$ at one ring-carbon atom thereof and $A_2$ is lower alkylene, the lower alkyl, lower alkoxy-lower alkyl, $HPh_2$-lower alkyl, pyridyl-lower alkyl, Am-lower alkyl, 5 or 6 ring-membered monoazacycloalkyl or monoazacycloalkyl-lower alkyl esters thereof, wherein alkoxy, Am or the aza-nitrogen is separated from the carboxy oxygen by at least 2 carbon atoms and Am is di-lower alkylamino, lower alkyleneimino, piperazino, 4 - lower alkylpiperazino or morpholino, the amide, mono- or di-lower alkylamides, mono- or bicyclic lower alkyleneamides, the hydroxamic acid, ammonium, alkali metal or alkaline earth metal salts thereof or pharmaceutically acceptable acid addition salts of the basic esters.

3. A compound as claimed in claim 2 and having the formula

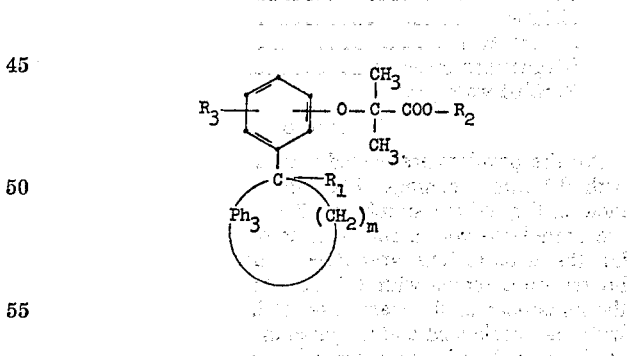

in which $Ph_3$ is 1,2-phenylene, (lower alkyl)-1,2-phenylene, (5 to 7 ring-membered cycloalkyl) - 1,2-phenylene, (lower alkoxy) - 1,2-phenylene, (halogeno) - 1,2-phenylene or (trifluoromethyl) - 1,2 - phenylene, $m$ is an integer from 2 to 4, $R_1$ is hydrogen or lower alkyl, $R_2$ is hydrogen, lower alkyl, lower alkoxy-lower alkyl, phenyl-lower alkyl, pyridyl-lower alkyl, di-lower alkylamino-lower alkyl, lower alkyleneimino-lower alkyl, N-lower alkyl-piperidyl or N-lower alkyl-piperidyl-lower alkyl, in which the nitrogen atoms are separated from the carboxy oxygen atom by at least two carbon atoms, and $R_3$ is hydrogen, lower alkyl or halogen, ammonium, alkali-metal or alkaline earth metal salts of the compounds in which $R_2$ is hydrogen or pharmaceutically acceptable acid addition salts of the compounds in which $R_2$ contains a nitrogen atom.

4. A compound as claimed in claim 3 and having the formula

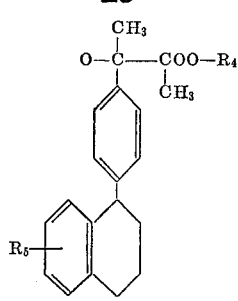

in which R₄ is hydrogen, an alkali metal, lower alkyl, pyridyl-lower alkyl, di-lower alkylamino-lower alkyl or N-lower alkylpiperidyl, and R₅ is hydrogen, lower alkyl, cyclohexyl, lower alkoxy, halogen or trifluoromethyl.

5. A compound as claimed in claim 3 and being the ethyl 2 - [4-(1,2,3,4-tetrahydro-1-naphthyl)-phenoxy]-isobutyrate.

6. A compound as claimed in claim 4 and being the 2-[4 - (1,2,3,4-tetrahydro-1-naphthyl)-phenoxy]-isobutyric acid.

7. A compound as claimed in claim 3 and being the 2-[4-(1,2,3,4-tetrahydro-1-naphthyl)-phenoxy]-acetic acid.

8. A compound as claimed in claim 3 and being the α-[4-(1,2,3,4-tetrahydro-1-naphthyl)-phenoxy]-butyric acid.

9. A compound as claimed in claim 3 and being the 2-diethylamino-ethyl 2-[4-(1,2,3,4-tetrahydro-naphthyl-1)-phenoxy]-isobutyrate or a pharmaceutically acceptable acid addition salt thereof.

10. A compound as claimed in claim 3 and being the 2-[4-(indanyl-1)-phenoxy]-isobutyric acid.

11. A compound as claimed in claim 3 and being the 2-[4-(benzosubernayl-1)-phenoxy]-isobutyric acid.

12. A compound as claimed in claim 3 and being the 2-[4-(6-methoxy-1,2,3,4-tetrahydro-1-naphthyl) - phenoxy]-isobutyric acid.

13. A compound as claimed in claim 3 and being the 2-[4-(7-chloro-1,2,3,4-tetrahydro-1 - naphthyl) - phenoxy]-isobutyric acid.

14. A compound as claimed in claim 2 and being the 2-[4-(4,4-dimethyl-1,2,3,4 - tetrahydro - 1 - naphthyl) - phenoxy]-isobutyric acid.

15. A compound as claimed in claim 3 and being the 2-[4-(5-methoxy-1,2,3,4-tetrahydro-1-naphthyl) - phenoxy]-isobutyric acid.

16. A compound as claimed in claim 3 and being the 2-[3-(1,2,3,4-tetrahydro-1-naphthyl) - phenoxy] - isobutyric acid or the cyclohexylammonium salt thereof.

17. A compound as claimed in claim 3 and being the 2-[2-(1,2,3,4-tetrahydro-1-naphthyl) - phenoxy] - isobutyric acid.

18. A compound as claimed in claim 4 and being the 2-diethylamino - ethyl 2 - [1,2,3,4-tetrahydro-1-naphthyl)-phenoxy]-isobutyrate and a pharmaceutically acceptable acid addition salt thereof.

19. A compound as claimed in claim 3 and being the γ-[4-(5-methyl-1,2,3,4-tetrahydro-1-naphthyl) - phenoxy)]- or its ethyl ester.

20. A compound as claimed in claim 2 and being the 2-[4-(7-trifluoromethyl-1,2,3,4 - tetrahydro - 1 - naphthyl)-phenoxy]-isobutyric acid.

21. A compound as claimed in claim 3 and being the 2-[4-(5-methyl-1,2,3,4-tetrahydro - 1 - naphthyl) - phenoxy]-isobutyric acid.

22. A compound as claimed in claim 3 and being the 2-[4-(1,2,3,4-tetrahydro-2-naphthyl) - phenoxy] - isobutyric acid.

23. A compound as claimed in claim 3 and being the 2-[4-(1,2,3,4-tetrahydro-1-naphthyl) - phenoxy] - isobutyric acid amide, N,N-diethylamide or 3-azabicyclo[3,2,2]nonyleneamide.

24. A compound as claimed in claim 3 and being the α-[4-(1,2,3,4-tetrahydro-1-naphthyl) - phenoxy] - propionic acid or its ethyl ester.

25. A compound as claimed in claim 2 and being the 2-[4-(7-cyclohexyl-1,2,3,4 - tetrahydro - 1 - naphthyl) - phenoxy]-isobutyric acid.

26. The levorotatory antipode of the compound claimed in claim 6.

27. The dextrorotatory antipode of the compound claimed in claim 6.

28. A compound of the formula shown in claim 1, wherein Ph₁, Ph₂ and A₂ have the meaning given and A₁ is lower alkenylene forming with Ph₁ a 5 to 7 membered ring carrying Ph₂ at one ring carbon atom thereof or the lower alkyl, lower alkoxy-lower alkyl, HPh₃-lower alkyl, pyridyl-lower alkyl, Am-lower alkyl, 5 to 6 ring-membered monoazacycloalkyl or monoazacycloalkyl-lower alkyl esters thereof, wherein alkoxy, Am or the aza-nitrogen is separated from the carboxy oxygen by at least 2 carbon atoms and Am is di-lower alkylamino, lower alkyleneimino, piperazino, 4-lower alkylpiperazino or morpholine, the amide, mono- or di-lower alkylamides, mono- or bicyclic lower alkyleneamides, the hydroxamic acid, ammonium, alkali metal or alkaline earth metal salts thereof or pharmaceutically acceptable acid addition salts of the basic esters.

29. The 1-dehydro derivatives of the compounds claimed in claim 2.

30. The 1-dehydro derivatives of the compounds claimed in claim 3.

31. A compound as claimed in claim 28 and being the 2-[4-(3,4-dihydro-1-naphthyl)-phenoxy]-acetic acid.

32. A compound as claimed in claim 28 and being the 2-[4-(3,4-dihydro-1-naphthyl)-phenoxy]-isobutyric acid.

33. A compound as claimed in claim 28 and being the 2-[4-(1,2-dihydro-1-naphthyl)-phenoxy]-isobutyric acid.

References Cited

UNITED STATES PATENTS 3,320,271  5/1967  Lednicer _____ 260—326.5 M
3,470,234  9/1969  Bencze _____ 260—473

LEWIS GOTTS, Primary Examiner

R. S. WEISSBERG, Assistant Examiner

U.S. Cl. X.R.

260—247.2 A, 268 PC, 294 A, 294.3 E, 295 F, 326.3 R, 520, 559 R

CASE SU-396/1-4

PO-1050
(5/69)

UNITED STATES PATENT OFFICE
CERTIFICATE OF CORRECTION

Patent No. 3,641,110      Dated February 8, 1972

Inventor(s) William Laszlo Bencze

It is certified that error appears in the above-identified patent and that said Letters Patent are hereby corrected as shown below:

Claim 4, column 29, the top of the structural formula should read ---

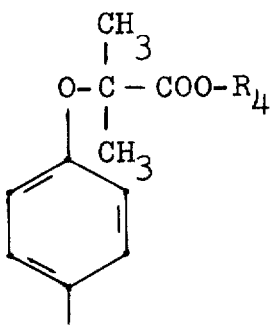

---.

Claim 19, column 29, line 61, after "[4-(", delete "5-methyl-"; same line, after "phenoxy", delete ")"; same line, after "]-", insert --- butyric acid ---.

Signed and sealed this 1st day of August 1972.

(SEAL)
Attest:

EDWARD M. FLETCHER, JR.      ROBERT GOTTSCHALK
Attesting Officer      Commissioner of Patents